United States Patent
Fan et al.

(10) Patent No.: US 12,547,674 B2
(45) Date of Patent: Feb. 10, 2026

(54) ADVERSARIAL IMAGE GENERATOR

(71) Applicant: International Business Machines Corporation, Armonk, NY (US)

(72) Inventors: Quanfu Fan, Lexington, MA (US); Sijia Liu, Somerville, MA (US); Gaoyuan Zhang, Medford, MA (US); Kaidi Xu, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 17/363,043

(22) Filed: Jun. 30, 2021

(65) Prior Publication Data

US 2023/0004754 A1 Jan. 5, 2023

(51) Int. Cl.
*G06F 18/214* (2023.01)
*G06F 3/12* (2006.01)
*G06N 20/00* (2019.01)

(52) U.S. Cl.
CPC ........ *G06F 18/2148* (2023.01); *G06F 3/1208* (2013.01); *G06F 3/1226* (2013.01); *G06N 20/00* (2019.01)

(58) Field of Classification Search
CPC .. G06F 18/2148; G06F 3/1208; G06F 3/1226; G06F 18/213; G06N 20/00; G06N 3/045; G06N 3/0475; G06N 3/094; G06V 10/774; G06V 10/82
See application file for complete search history.

(56) References Cited

U.S. PATENT DOCUMENTS

| | | | |
|---|---|---|---|
| 10,825,148 B2 | 11/2020 | Tagra et al. | |
| 10,839,268 B1 | 11/2020 | Ardulov et al. | |
| 10,910,099 B2 | 2/2021 | Xu et al. | |
| 11,151,703 B2 | 10/2021 | Sargent | |
| 2021/0103814 A1* | 4/2021 | Tsiligkaridis | G06N 3/08 |
| 2023/0206601 A1* | 6/2023 | Metzen | G06V 40/113 |
| | | | 382/224 |

FOREIGN PATENT DOCUMENTS

| | | |
|---|---|---|
| CN | 111340008 A | 6/2020 |
| DE | 102020004960 A1 | 5/2021 |

OTHER PUBLICATIONS

Eykholt et al., "Robust Physical-World Attacks on Deep Learning Visual Classification," In Proceedings of the IEEE Conference on Computer Vision and Pattern Recognition, 2018, pp. 1625-1634.
Sharif et al., "Accessorize to a Crime: Real and Stealthy Attacks on State-of-the-Art Face Recognition," ACM, In Proceedings of the 2016 ACM SIGSAC Conference on Computer and Communications Security, 2016, pp. 1528-1540.

(Continued)

*Primary Examiner* — Helen Zong
(74) *Attorney, Agent, or Firm* — Yee & Associates, P.C.

(57) ABSTRACT

Adversarial patches can be inserted into sample pictures by an adversarial image generator to realistically depict adversarial images. The adversarial image generator can be utilized to train an adversarial patch generator by inserting generated patches into sample pictures, and submitting the resulting adversarial images to object detection models. This way, the adversarial patch generator can be trained to generate patches capable of defeating object detection models.

17 Claims, 10 Drawing Sheets

(56) References Cited

OTHER PUBLICATIONS

Xu et al., "Adversarial T-shirt! Evading Person Detectors in A Physical World," arXiv:1910.11099v3 [cs.CV], Jul. 7, 2020, 23 pages, https://arxiv.org/pdf/1910.11099.pdf.
Pautov et al., "On adversarial patches: real-world attack on ArcFace-100 face recognition system," 2019 International Multi-Conference on Engineering, Computer and Information Sciences (SIBIRCON), arXiv:1910.07067v3 [cs.CV], Apr. 1, 2020, 6 pages.
"AI-Aware Engine for Matching Learners with Mentors," IP.Com., An IP.com Prior Art Database Technical Disclosure, IP.com No. IPCOM000261341D, IP.com Electronic Publication Date: Feb. 24, 2020, 5 pages.
"A Method for social and location-aware group sequential recommendation," IP.Com, An IP.com Prior Art Database Technical Disclosure, IP.com No. IPCOM000252662D, IP.com Electronic Publication Date: Feb. 1, 2018, 4 pages.
"A Method to Manage Patches on Multiple Computer Systems," IP.Com, An IP.com Prior Art Database Technical Disclosure, IP.com No. IPCOM000259485D, IP.com Electronic Publication Date: Aug. 15, 2019, 3 pages.
McCoyd et al., "Minority Reports Defense: Defending Against Adversarial Patches," arXiv:2004.13799v1 [cs.LG] Apr. 28, 2020, Printed May 14, 2021, 9 pages.
Yang et al., "Design and Interpretation of Universal Adversarial Patches in Face Detection," arXiv:1912.05021v3 [cs.CV] Jul. 17, 2020, Printed May 14, 2021, 20 pages.
Metzen et al., "Efficient Certified Defenses Against Patch Attacks on Image Classifiers," arXiv:2102.04154v1 [cs.LG] Feb. 8, 2021, Published as a conference paper at ICLR 2021, 17 pages.
Brown et al., "Adversarial Patch," 31st Conference on Neural Information Processing Systems (NIPS 2017), 2017, 5 pages.
Thys et al., "Fooling automated surveillance cameras: adversarial patches to attack person detection," CVPR Workshops, arXiv:1904.08653v1 [cs.CV], Apr. 18, 2019, 7 pages.
Zhao et al., "Seeing isn't Believing: Towards More Robust Adversarial Attack Against Real World Object Detectors," CSS19, arXiv:1812.10217v3 [cs.CV], Sep. 4, 2019, 16 pages.
Zhang et al., "Deep Mutual Learning," CVPR 2018, arXiv:1706.00384v1 [cs.CV], Jun. 1, 2017, 10 pages.
Lan et al., "Knowledge Distillation by On-the-Fly Native Ensemble," NIPS 2018, arXiv:1806.04606v2 [cs.CV], Sep. 8, 2018, 11 pages.
Chen et al., "Can 3D Adversarial Logos Cloak Humans?," arXiv:2006.14655v1 [cs.LG], Jun. 25, 2020, 10 pages.
Bor-Chun Chen et al., "Toward Realistic Image Compositing with Adversarial Learning," Printed Jun. 29, 2021, 10 pages.
Athalye et al., "Synthesizing Robust Adversarial Examples," arXiv:1707.07397v3 [cs.CV], Jun. 7, 2018, 19 pages.
Wu et al., "Making an Invisibility Cloak: Real World Adversarial Attacks on Object Detectors," arXiv:1910.14667v2 [cs.CV], Jul. 22, 2020, 16 pages.
"Generating Realistic Physical Adversarial Examples by Patch Transformer Networks," CVPR 2021 Submission #9922, 2021, 13 pages.
Athalye et al., "Obfuscated Gradients Give a False Sense of Security: Circumventing Defenses to Adversarial Examples," arXiv:1802.00420v4 [cs.LG], Jul. 31, 2018, 12 pages.
Carlini et al., "Audio Adversarial Examples: Targeted Attacks on Speech-to-Text," IEEE, In 2018 IEEE Security and Privacy Workshops (SPW), 2018, pp. 1-7.
Xu et al., "Structured Adversarial Attack: Towards General Implementation and Better Interpretability," In International Conference on Learning Representations, 2019, 21 pages.
List of IBM Patents or Applications Treated as Related, Dated Jun. 29, 2021, 2 pages.
Fan et al., "Detecting Hybdrid-Distance Adversarial Patches," U.S. Appl. No. 17/363,054, filed Jun. 30, 2021.

\* cited by examiner

ADVERSARIAL IMAGE GENERATOR

BACKGROUND

The systems and methods of the present disclosure relate to object detection.

Adversarial patches are an emerging technology designed to deceive automated object detection, particularly machine-learning-based recognition. As an example, a camera observing a space may transmit a video feed to a machine learning model trained to identify people seen by the camera. In response, a person may wear clothing with an adversarial patch (for example, an adversarial patch may be a pattern printed on a T-shirt). To a human observer, an adversarial patch may appear as a mass of seemingly random pixels, not unlike corrupted image data. However, the specific pattern of an adversarial patch, when analyzed by a machine learning model, may throw off results of the machine learning model (e.g., a system attempting to identify a person in an image may fail to do so simply due to the image including an adversarial patch). In this way, adversarial patches can serve as a digital form of camouflage.

While adversarial patches may be useful to prevent unauthorized surveillance, malicious actors may use them to fool helpful object detection models. For example, adversarial patches have been placed on street signs in an apparent attempt to prevent automated vehicle safety systems from being able to recognize the signs.

SUMMARY

Some embodiments of the present disclosure can be illustrated as a method. The method comprises training an adversarial image generator. The method also comprises receiving a sample picture depicting an object. The method also comprises receiving an adversarial patch. The method also comprises generating, via the adversarial image generator, an adversarial image, where the adversarial image depicts the adversarial patch in the sample picture with the object, and where the generating includes transforming the adversarial patch based on environmental attributes of the sample picture (resulting in a transformed adversarial patch) and inserting the transformed adversarial patch into the picture, resulting in the adversarial image.

Some embodiments of the present disclosure can also be illustrated as a computer program product comprising a computer readable storage medium having program instructions embodied therewith, the program instructions executable by a computer to cause the computer to perform the method discussed above.

Some embodiments of the present disclosure can be illustrated as a system. The system may comprise memory and a central processing unit (CPU). The CPU may be configured to execute instructions to perform the method discussed above.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
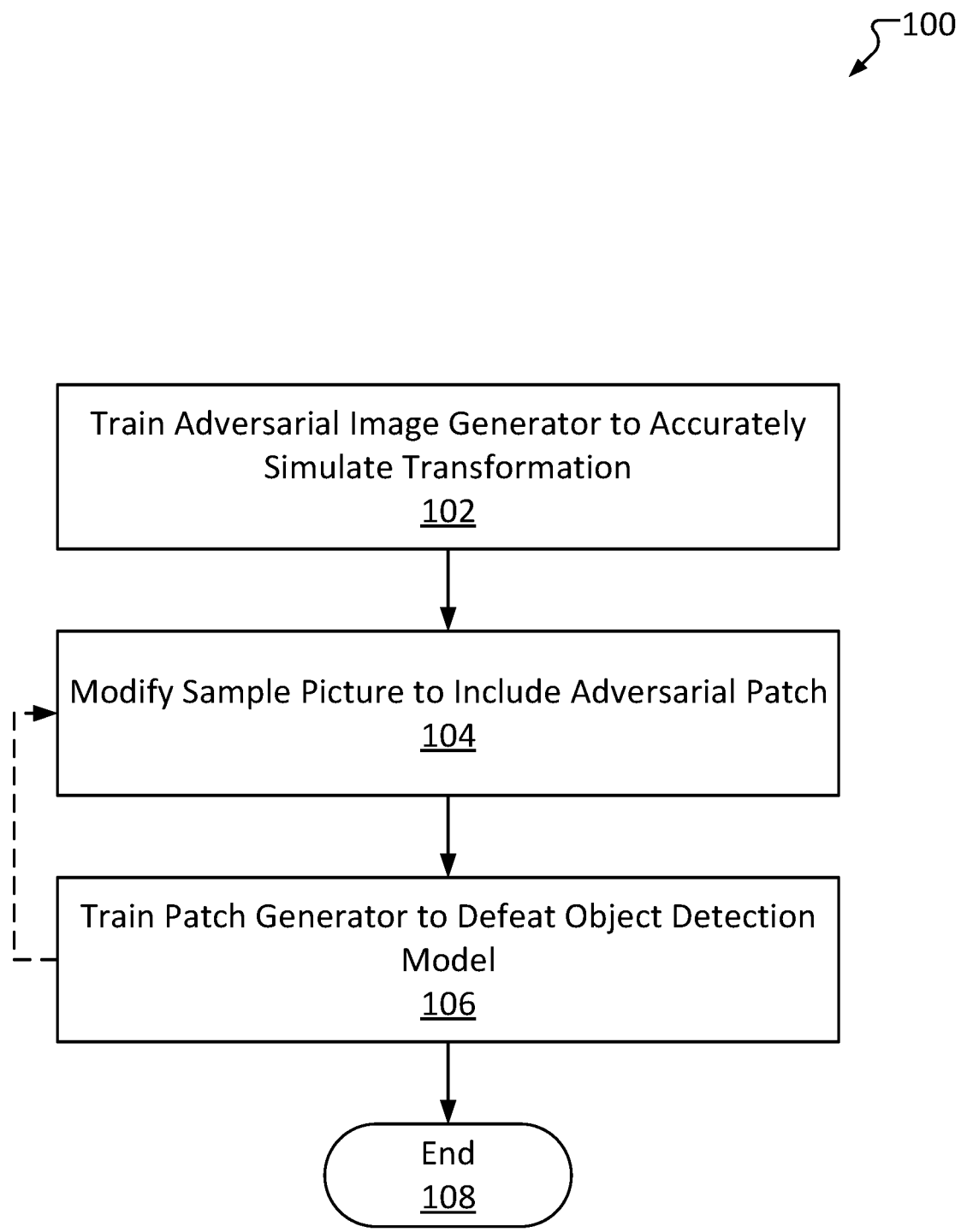
FIG. 1 is a high-level method for training an adversarial patch generator to defeat object detection models via realistic adversarial images, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to design adversarial patches to overcome object detection models. More particular aspects relate to a system and a method to train an adversarial patch image generator, generate an adversarial patch from, modify images to include the patch, submit the modified images to an object detection model, and train an adversarial patch generator based on the object detection model performance and on the modified images.

Adversarial patches are an emerging technology designed to deceive automated object detection, particularly machine-learning-based recognition. As an example, a camera observing a space may transmit a video feed to a machine learning model trained to identify people seen by the camera. In response, a person may wear clothing with an adversarial patch (for example, an adversarial patch may be a pattern printed on a T-shirt). To a human observer, an adversarial patch may appear as a mass of seemingly random pixels, similar to corrupted image data. However, the specific pattern of an adversarial patch, when analyzed by a machine learning model, may throw off results of the machine learning model (e.g., a system attempting to identify a person in an image may fail to do so simply due to the image including an adversarial patch). In this way, adversarial patches can serve as a digital form of camouflage.

As an illustrative example, a user may capture an image of a dog and a cat. The image may be input to an object detection model, which may detect, based on a trained machine learning model, that the image depicts a dog and a cat. A user may then put an adversarial patch on the dog and capture an otherwise-identical image. The second image may be input to the same object detection model. However, due to the adversarial patch included in the second image, the object detection model may incorrectly determine that the second image only depicts a cat (e.g., the system may fail to detect the dog at all). In other examples, the adversarial patch may cause the system to incorrectly determine that the second image depicts a cat and an avocado (e.g., the system may misidentify the dog as an avocado) or that the second image depicts a sunset (e.g., the system may misidentify both the dog and the cat). Notably, the adversarial patch need not simply be a picture of an avocado (or a blank covering) placed over the dog to obscure it; the patch may appear to the user to be an abstract image with no discernable pattern, and the majority of the identifying features of the dog (e.g., the dog's face, overall shape, markings, etc.) may still be visible in the second image. Nonetheless, the adversarial patch may still be able to disrupt the object detection model simply by being present in the image.

A "performance" of an adversarial patch describes how consistently the patch is able to disrupt an object detection model (e.g., how much of an impact the patch has on the system's accuracy). Performance can vary wildly between patches, models, and images; an image including a first patch may completely fool a first object detection model (e.g., YOLOv3) but be consistently defeated by a second object detection model (e.g., RetinaNet). At the same time, an image including a second patch may be consistently defeated by the first system but completely fool the second system.

Adversarial patch performance often varies with how the patch appears in a given image. For example, a person may be wearing a shirt with an adversarial patch printed on the shirt. A picture of the person may be captured, compressed, and input to an object detection model. The appearance of the patch in the compressed picture (i.e., what the recognition system "sees") may differ significantly from an uncompressed image file of the adversarial patch itself. For example, the captured picture may be poorly lit, resulting in portions of the patch appearing black or "washed out." As another example, the person's shirt may be wrinkled, resulting in portions of the patch appearing distorted/shaded slightly differently. Further, the patch may not be directly facing the camera capturing the image, which may result in portions of the patch being omitted entirely from the picture, some portions appearing compressed, etc.

Another possible impact on patch performance is distance from a camera. For example, two images may be captured of a person wearing a shirt including an adversarial patch: a first image where the person (and, more importantly, the patch) is relatively close to the camera capturing the image (e.g., within 3 meters), and a second image where the person (and patch) are relatively far from the camera (e.g., 9 meters or farther away). The appearance of the patch in the two images will likely be substantially different, as the patch in the second image will appear smaller, and the distance will result in some lost information (e.g., the patch will appear less detailed). Because appearance within an image is a major factor of performance, the patch can be expected to perform differently between the two images.

Adversarial patches are typically generated and checked for effectiveness at deceiving object detection models. This checking often includes submitting the generated patch directly to an object detection model. A patch generated and evaluated this way may be an image file, such as a bitmap (.bmp). The patch depicted in such an image file may be referred to as the "base patch." Due to how it is generated, a base patch may be most effective at deceiving object detection models when the patch is directly inserted into an existing image, such as by manipulating a digital image file to paste the patch into the image. In practice, the patch may be implemented via, for example, a printed sticker, a logo on a shirt, a wearable display, etc., and a picture of the patch may be captured (such as by a camera) and sent to an object detection model. However, conditions surrounding the picture capture, such as lighting, distance from the camera to the patch, viewing angle, and properties of the camera can all result in the patch appearing distorted in the picture. As noted above, this can result in impaired performance of the patch. Even "ideal" conditions (e.g., when the patch is illuminated by flat/neutral lighting, when the patch was relatively close to a camera capturing a picture of the patch, when the patch is plainly visible in the picture, etc.) are likely to result in at least some deviation between the captured picture and the image of the patch itself. As a result, features of the patch that enable it to mislead an object detection model (whatever those features may be) can become distorted and/or blurred. Thus, when adversarial patch generators are trained primarily based on images of patches themselves (i.e., "base patches"), the resultant patches may not be as effective in practice as the training process might suggest. As an example, a patch consisting of a regular grid of black and white squares, when viewed from a sufficient distance, may simply appear as a solid block of gray. The sharp contrast between the black squares and the white squares may be the feature primarily responsible for the patch's effectiveness. Thus, viewing the patch from a great distance can result in the patch losing effectiveness, as an object detection model will not "see" the grid.

A "patch generator" may be a machine learning model that can generate adversarial patches. As adversarial patches are typically most effective within certain conditions (such as a particular distance range, lighting condition, etc.), different generators may be utilized to generate patches that are effective in different conditions. For example, a first patch generator may generate adversarial patches that are effective at relatively short distances (but ineffective at longer distances), while a second patch generator may generate adversarial patches that are effective at farther distances (but ineffective at near distances).

Systems and methods consistent with the present disclosure enable generation of "pre-transformed" or "primed" adversarial patches that are effective in real-life scenarios. In essence, while a "base" patch may be most effective against object detection models, this effectiveness is hindered by the distortion resulting from implementing the patch. To address this, a primed patch may be "preemptively un-distorted" so that, when viewed in a real-life environment, the primed patch more closely resembles the base patch, rendering the primed patch more effective. For example, an adversarial patch (a "base patch"), when observed in a real-life situation, may get distorted in a predictable way. As a simple example, the base patch may get rotated by 10 degrees clockwise. This distortion may reduce performance of the patch, as it can cause the patch to appear different from the base patch. However, as the distortion is predictable, the adversarial patch can be "primed" for this distortion by preemptively reversing it (e.g., the patch may be rotated by 10 degrees counter-clockwise before it is implemented). This way, when the primed patch is implemented (e.g., when it is printed onto a shirt or sticker) and a camera captures a picture including the primed patch, the predicted distortion will result in the primed patch appearing as the base patch. This way, the primed patch is more likely to achieve the effectiveness of the base patch. An illustrative example of this concept is provided and discussed below with reference to FIG. 8A-8D.

Primed patches can be used to train models to be increasingly robust and capable of defeating them. As used herein, "defeating" an adversarial patch refers to a system successfully identifying an object the patch is attempting to obfuscate (e.g., identifying a person wearing a shirt with an adversarial patch on it). In some instances, adversarial patches may be specifically detected and disregarded (e.g., removed from an image or removed from consideration), allowing a system to recognize objects without considering the patch. In other instances, adversarial patches may simply go unnoticed, and the system may recognize objects in spite of the patch.

Performance of an adversarial patch can be substantially altered by distortion, though the degree to which performance suffers may depend upon the patch. As an example, a first patch may consistently deceive an object detection model, but if the first patch is tinted a slightly different color, the object detection model may suddenly be capable of defeating the first patch. However, a second patch may similarly be capable of deceiving an object detection model (possibly even more reliably than the first patch). If the second patch is tinted in the same manner as the first patch, the second patch may retain some effectiveness (i.e., the tinted second patch may still deceive the object detection model, albeit perhaps with reduced consistency). Further, when implementing an adversarial patch, such as by printing the patch onto an article of clothing, the patch may become distorted. For example, printing the first patch onto a shirt may result in the patch being slightly tinted, which may therefore drastically reduce performance of the first patch. This, in effect, may mean that the first patch is deceptively ineffective, as it performs well in laboratory tests but fails when actually implemented. Similarly, this means that training an object detection model to defeat the first patch may not be a particularly beneficial use of limited computing resources, as the first patch is unlikely to be relevant in practice.

Thus, evaluating the first patch in a "realistic" scenario may save computing resources in the long run. Similarly, training the object detection model to defeat the raw second patch may also be a waste, as the second patch may perform differently (but still effectively) in practice. One way to evaluate patches in a realistic scenario is to create the scenario; in essence, the patch being evaluated can be printed onto a shirt, a picture may be captured of a user wearing the shirt, and the picture may be submitted to the object detection model. However, in practice, as additional patches and settings are evaluated, this method quickly becomes untenable due to costs of printing multiple shirts, staging multiple pictures, etc. Thus, a scalable way to evaluate real-world performance of adversarial patches would be particularly advantageous.

FIG. 1 is a high-level method 100 for training an adversarial patch generator to defeat object detection models via realistic adversarial images, consistent with several embodiments of the present disclosure. Method 100 comprises training an adversarial image generator at operation 102. An example of how adversarial image generators may be trained is provided in FIG. 2, discussed below with reference to method 200. In general, operation 102 includes receiving a training patch as well as a set of training pictures depicting the patch. The training pictures may have been captured in several different environmental conditions (e.g., environmental attributes such as different lighting conditions, different poses, different distances from a capturing camera, etc. may differ between the pictures). Operation 102 further includes mapping transformations between the received sample patch and the appearance of the patch in a picture, and training a model based on an association between the environmental conditions and the transformations. This training can be repeated based on a size of the set of training pictures to increase performance of the adversarial image generator.

Performance of an adversarial image generator may be evaluated, for example, by submitting a patch and a test picture to the image generator. The test picture may be based on an input picture depicting the patch, but the patch may be obfuscated or removed from the test picture. The adversarial image generator may then attempt to insert the submitted patch into the test picture, resulting in an output image. The output image may then be compared to the input picture to determine how close the image generator was to the "correct" or "actual" picture. An example performance evaluation is depicted and described below with reference to FIG. 4A-4D.

A patch generator can be trained as a machine learning model. For example, an initial iteration of a patch generator may generate patches randomly. The patches may then be tested against one or more object detection models to determine an effectiveness rating for the patch. Randomly generated adversarial patches are generally unlikely to be effective, so adjustments may be made to the generator, after which the generator may be used to generate additional patches. This training process can be repeated until the generator produces patches that satisfy given performance criteria.

Pixels may be described in terms of "relative position" in multiple different images. For example, a first relative position may be a top-left position (e.g., in a top row and a leftmost column). To illustrate, a first image may have a blue pixel in a top-left position, while a second image may have a red pixel in a top-left position. This can be described as a blue pixel in a first relative position in the first image and a red pixel in the first relative position in the second image.

This "relative location" terminology can also refer to patches (e.g., a near patch may have a blue pixel in a second relative location while a far patch may have a red pixel in the second relative location).

Method 100 further comprises modifying a sample picture to include an adversarial patch at operation 104. Operation 104 may include receiving both the sample picture and the patch. For example, operation 104 may include receiving an adversarial patch from a database or a user. In some instances, the receiving of operation 104 may include generating an adversarial patch via an adversarial patch generator. In some instances, operation 104 may further include training an adversarial patch generator (in which case the received adversarial patch may be generated by the trained generator). Different generators may be utilized to generate patches primed for different kinds of expected distortion. For example, a "near" patch generator may generate adversarial patches that are effective at relatively short distances (but may be ineffective at longer distances), while a "dim lighting" patch generator may generate adversarial patches that are effective when included in pictures captured in dim lighting conditions (but may be ineffective in brightly lit conditions). An example of how patch generators may be trained is provided in FIG. 7, discussed below with reference to method 700. As an explanatory example, a camera may capture a picture including an adversarial patch and an object. An object detection model may attempt to identify the object. If the object detection model is unable to identify the object, the patch may be considered an effective patch, and the object detection model may be updated (e.g., one or more weights may be adjusted). The process can be repeated until the object detection model reliably defeats the patch. In some instances, receiving a sample picture at operation 104 may include capturing a sample picture, such as with a camera.

The sample picture and adversarial patch may be received by the adversarial image generator trained at operation 102. As an example, operation 104 may include receiving a picture of a person wearing a shirt. The shirt may depict a placeholder patch (such as a blank rectangle with markers on each corner). The adversarial image generator may modify the picture to replace the placeholder with the adversarial patch by transforming the patch based on the environment of the picture. As an example, the picture may have been captured in a dimly-lit room and the placeholder patch may not be directly facing the camera (perhaps because the person wearing the shirt is facing a different direction). In such an instance, the adversarial image generator may, based on its training, darken the adversarial patch and compress/rotate the adversarial patch. The adversarial image generator may then replace the placeholder with the modified adversarial patch. In contrast, as an additional example, the picture may have been captured in a well-lit room; in such an instance, rather than darkening, the adversarial image generator may increase a brightness of the adversarial patch. The modifying of operation 104 results in at least one adversarial image. The adversarial image advantageously depicts the adversarial patch in a realistic scenario (e.g., simulating color, shape, and lighting changes that might be expected in a picture captured of the adversarial patch), without needing to, for example, print a patch onto a shirt and capture a new picture for every patch received at operation 104.

Method 100 further comprises training, at operation 106, an adversarial patch generator to defeat an object detection model. A more detailed example of training such a generator is provided as method 700, discussed in further detail below with reference to FIG. 7. As an overview, operation 106 may include submitting the modified adversarial image (produced via operation 104) to an object detection model, determining whether the system can defeat the patch, and revising the system until it can. Operations 104 and 106 may be repeated for multiple modified adversarial images and/or patches. Method 100 then ends at 108.

For example, a "sample picture" depicting an object and a placeholder patch may be captured by a camera. The sample picture may depict a person standing in a dark area 15 m away from the camera. The person may be wearing a shirt depicting the placeholder patch. Operation 104 may include digitally altering the sample picture to appear as though the person's shirt has an adversarial patch on it. Operation 106 may include submitting the altered image to an object detection model and receiving an output from the object detection model. If the object detection model successfully identified the person in the image, then the model has successfully defeated the adversarial patch. If the object detection model misidentified the person in the image, then the model may have failed to defeat the adversarial patch. If the model failed, the model can be revised (e.g., features/layers can be modified), and the test can be run again to determine if the revision was helpful. In some instances, the model may be revised until the most recent revision results in decreased performance (relative to the preceding revision).

Figure 2:
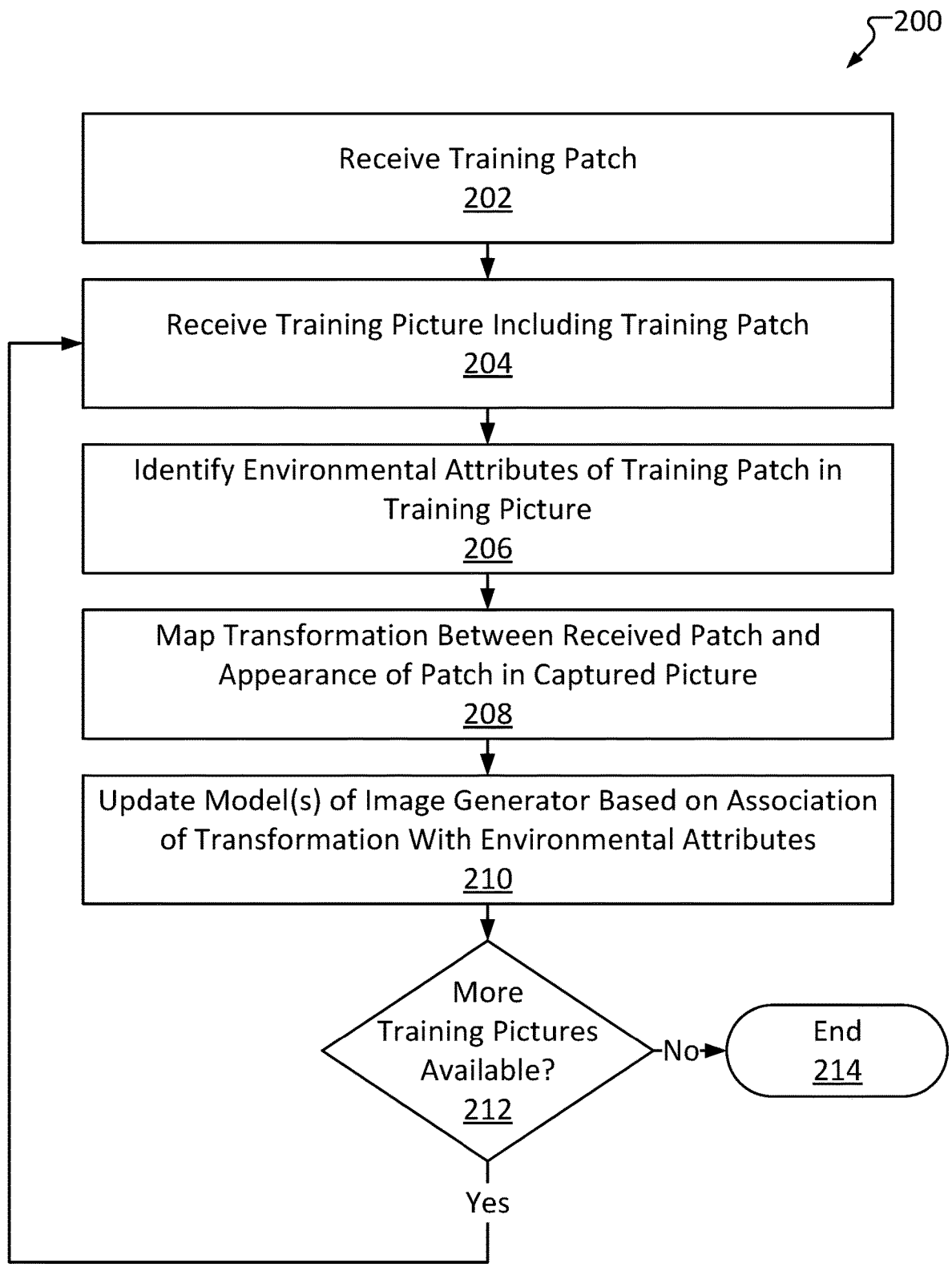
FIG. 2 is a method for training an adversarial patch adversarial image generator, consistent with several embodiments of the present disclosure.

FIG. 2 is a method 200 for training an adversarial image generator, consistent with several embodiments of the present disclosure. Method 200 provides a detailed example of a possible implementation of operation 102 of method 100. As an overview, method 200 includes comparing pictures of patches to the (digital) patches themselves in order to learn how environmental conditions impact the appearance of the patches. For example, a picture captured in poor lighting conditions will result in a patch in the picture appearing darker than the patch actually is; method 200 describes learning relationships like this. Once trained, an image generator can then predict how a given patch will appear if it had been included in a given picture.

Method 200 comprises receiving a training patch at operation 202. In some instances, the training patch may be a placeholder patch, such as a blank image, sample Red/Green/Blue (RGB) pallet, or scan target. In some instances, the training patch may be an adversarial patch. The training patch may be received from a database or a user. In some instances, operation 202 may include generating the training patch (such as via an adversarial patch generator).

Method 200 further comprises, at operation 204, receiving a training picture including the training patch received via operation 202. For example, operation 204 may include causing a camera to capture a picture of a person wearing an item of clothing bearing the training patch. In some instances, operation 204 may include receiving the training picture from a database.

Method 200 further comprises identifying, at operation 206, environmental attributes of the training picture and, more particularly, of the training patch. Environmental attributes include attributes such as lighting, shape, color, etc. For example, operation 206 may include identifying how well-lit the patch is in the picture, as well as a shape of the patch as it appears in the picture. In some instances, the environmental attributes can be received via a user input and/or as metadata included with the training picture. As an example, the training picture received at operation 204 may depict a person wearing a shirt with the training patch embedded into a pattern of the shirt. The person, as depicted, may be standing in a dark corner of a room. The picture may include metadata describing a location of the patch in the picture. For example, the location of the patch may be described as a set of pixel coordinates dictating corners of the patch, or lines or curves representing edges of the patch, etc. The metadata may also include a light level in the region of the picture including the patch. For example, the light level may be a normalized value between 0 (complete darkness) and 1 (entirely washed-out in light). In some instances, operation 206 may include determining a light level by comparing an RGB value of a given pixel in the patch as it appears in the picture with a corresponding pixel of the patch received at operation 202. For example, if a pixel in the patch is grey but its counterpart in the picture is nearly black, this may indicate that the light level is relatively low.

Method 200 further comprises mapping, at operation 208, a transformation between the patch received at operation 202 and the patch as it appears in the picture received at operation 204. Operation 208 may include, for example, determining differences in size, shape, and color between the "apparent" patch in the picture and the "raw" patch received at operation 202. In some instances, operation 208 may include generating a transformation model that can transform the raw patch into the apparent patch.

Method 200 further comprises updating, at operation 210, one or more models of an adversarial image generator based on association between the mapping of operation 208 and the environmental attributes of operation 206. As an example, an adversarial image generator may include a geometric transformation model configured to receive a picture and a patch as inputs. Based on these inputs, the geometric transformation model may output a transformation which, when applied to an input patch, may transform the input patch into a different geometry so that the transformed input patch could be realistically inserted into the received picture. In other words, the transformed input patch may not look "out of place" in the received picture. Notably, the input patch is not necessarily the same as the received patch; in other words, the transformation can be applied to a different input patch, and the transformed different input patch will also not look "out of place" if inserted into the received picture. The received picture may include one or more indicators describing where the transformed patch should be. For example, the received picture may include an outlined region, one or more scan targets, etc. The geometric transformation model can warp, stretch, resize, and/or rotate the raw patch so that the transformed patch fits into the picture as indicated.

As another example, the adversarial image generator may include a lighting adaptation model configured to receive a picture and a patch as inputs and to output a transformed patch adapted for a different light level. The received picture may include metadata describing a light level of the patch. For example, the received picture may indicate an illumination level on a scale from 0 to 1 with 0.5 being a "neutral" illumination.

The mapping of operation 208 can be associated with the environmental attributes of operation 206. This can help the model learn to adapt patches differently for different pictures. For example, a first training picture may have a first set of environmental attributes such as "dim lighting," "green tint," and/or "far from camera." A first transformation may then be mapped at operation 208. A second training picture may have a second set of environmental attributes, which may only include a single attribute: "bright lighting." A second transformation may then be mapped at operation 208. The first transformation may be associated with the first set of environmental attributes and the second transformation may be associated with the second set of environmental attributes. A third picture may be received, having a third set of environmental attributes including "bright lighting." Because the third set of environmental attributes matches the second set of environmental attributes, the model may generate a transformation based on the mapping associated with the second set of environmental attributes (i.e., the second mapping). In such an instance, the third transformation may be substantially similar to the second transformation. As this system is scaled by increasing training pictures and environmental attributes, the model can learn to merge multiple established transformations based on environmental attributes of an input picture.

In practice, an adversarial patch may be printed onto clothing (or other objects) by a printer. The printing process may inherently result in some colors being changed. These changes may appear to be minor. For example, a red color of a raw patch may be a slightly different shade of red on the printed patch, this can result in performance impacts on the patch. This change can be specific to a given printer model (e.g., a first printer might shift reds to a different shade of red while a second printer may shift blues to a different shade of blue). Thus, the adversarial image generator may include a printer color transformation model configured to receive a printer profile and a patch as inputs and to output a transformed patch based on an expected color discrepancy between the received patch and a printed patch.

Method 200 further comprises determining whether additional training pictures are available at operation 212. In essence, operations 204 through 212 enables iterating through and repeatedly adjusting the adversarial image generator based on a set of pictures. This can result in training the generator to handle a broad range of environmental conditions. If more pictures are available (212 "Yes"), method 200 loops back to receiving an additional picture at operation 204 and repeats operations 204-212. Once all pictures have been utilized (212 "No"), method 200 ends at 214.

Figure 3:
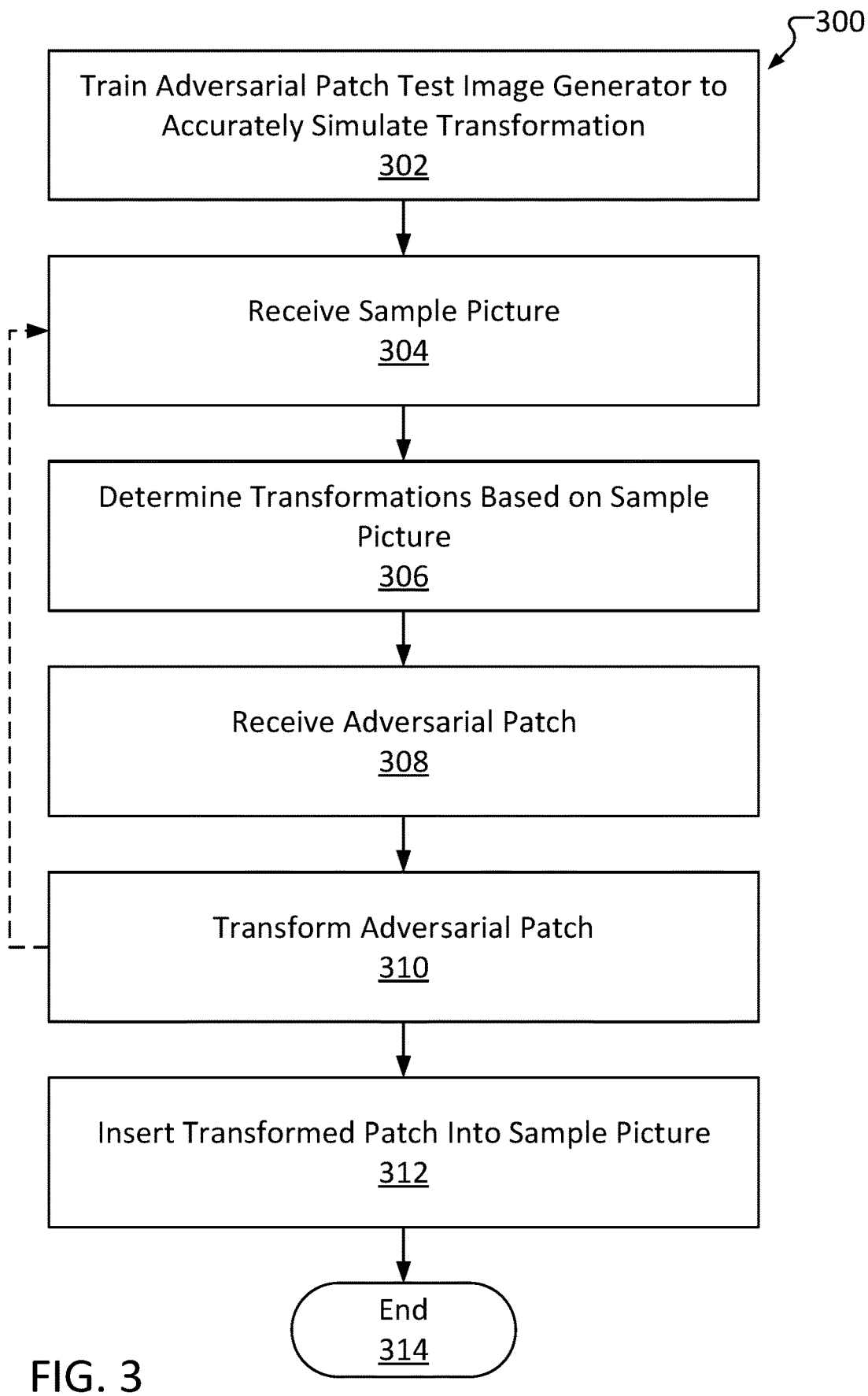
FIG. 3 is a method for modifying a sample picture into an adversarial image including an adversarial patch, consistent with several embodiments of the present disclosure.

FIG. 3 is a method 300 for modifying a sample picture into an adversarial image including an adversarial patch, consistent with several embodiments of the present disclosure. Method 300 comprises training, at operation 302, an adversarial image generator to be able to model transformations. Operation 302 may be performed in a substantially similar manner to operation 102 of method 100 and/or according to method 200. Once the image generator is trained, it may include several models trained to determine specific transformations. For example, the image generator may include a geometric transformation model configured to receive a sample picture and output a geometric transformation based on the sample picture. The geometric transformation may enable a system performing method 300 to transform a shape of an input adversarial patch into a final shape matching that of a placeholder patch in a sample picture.

Method 300 further comprises receiving a sample picture at operation 304. The training process at operation 302 may include receiving one or more pictures; these may or may not include the sample picture received at operation 304. The sample picture received at operation 304 may be captured by a camera and uploaded by a user to a system performing method 300. An example sample picture 420 is provided and discussed below with reference to FIG. 4B. In some instances, the sample picture may include a placeholder patch, such as a scan target indicating a region for an adversarial patch to be inserted. This may advantageously improve accuracy of a geometric transformation by providing known reference points defining a final shape of a patch. In some instances, the sample picture received at operation 304 may also include metadata describing environmental conditions such as lighting, whether the picture was captured indoors vs. outdoors, etc. In some instances, the sample picture received at operation 304 may also include metadata describing a printing information such as a printer, a printing technique (e.g., ink printing, hydro transfer printing, embroidery, etc.), printing media (e.g., inks, paints, dyes, etc.), and the like to be simulated.

Method 300 further comprises determining, at operation 306 transformations based on the sample picture. As an illustrative example, an output geometric transformation may be a matrix T of value pairs describing how each pixel of a rectangular patch should be translated. For example, T[2,3] may include values describing how pixel [2,3] (i.e., the pixel on the second row, third column) of a rectangular patch should be moved. A pair of values at T[2,3] such as (0.1, 1.0) may indicate that pixel [2,3] should be moved to 10% of its distance from a y-axis and 100% of its distance from an x-axis (i.e., remain stationary relative to the x-axis). Thus, after every pixel is moved according to its corresponding value pair, the rectangular patch may have been warped into a shape resembling the placeholder patch. This is merely provided as an example of one implementation of a geometric transformation; trained geometric transformation models in other instances may output different types of geometric transformations (e.g., an equation rather than a matrix, etc.). Other transformations can be produced by other models as well, such as color consistency transformations configured to convert the patch's colors to match the lighting of the picture. Notably, the trained image generator can include multiple models which can each produce a transformation accounting for a different aspect (e.g., a geometric transformation model, a lighting model, a printer model, etc.).

Method 300 further comprises receiving an adversarial patch at operation 308. Operation 308 may include, for example, receiving a patch from an online or local database, or being input by a user (e.g., the user may scan or photograph a patch and upload it, etc.). In some instances, operation 308 may include generating the patch via an adversarial patch generator. Additional detail on patch generation is provided below with reference to method 700 of FIG. 7.

Method 300 further comprises transforming the adversarial patch at operation 310. Operation 310 may include, for example, applying the transformation(s) determined at operation 306 to the adversarial patch received at operation 308. The order of the transformations can vary depending upon embodiment. For example, in some instances, a printer color consistency transformation may be performed on the received adversarial patch, resulting in a "first-stage" transformed patch. A lighting transformation may then be performed on the first-stage transformed patch, resulting in a second-stage transformed patch. Finally, a geometric transformation may be performed on the second-stage transformed patch, resulting in a final transformed patch (referred to as a "transformed patch" for brevity). In some instances, the transformations may be performed in any order. In some instances, transformations may result in some data being lost. For example, if a placeholder patch is only partially visible in a sample picture, a corresponding geometric transformation may essentially result in deleting part of the adversarial patch. While colors of the deleted part may not matter for the final transformed patch (as they are deleted anyway), it may be generally preferable to perform "lossy" transformations last, as some transformations may depend in part on the patch as a whole (e.g., a printing transformation may weight each pixel towards an average brightness of the entire patch; deleting part of the patch may skew the average and thus skew the results). Once transformed, the adversarial patch may appear as if it were in the sample picture when the picture was captured (e.g., it may be distorted to appear as if it were on a shirt worn by a user in the picture, may be recolored according to discrepancies between the "raw" patch's digital color and a given printer's capability to reproduce those digital colors, etc.).

Method 300 further comprises inserting the transformed patch into the sample picture at operation 312. Operation 312 may include, for example, replacing a placeholder patch in the sample picture with the transformed patch. In some instances, the placeholder patch may not be entirely obscured by the transformed patch (i.e., a geometric transformation may not necessarily be perfect), and thus portions of the placeholder patch may remain visible. In such instances, it may be preferable to leave such "leftover" portions the placeholder patch intact, as they may already appear realistic in terms of lighting and geometry (since they may have actually been part of the original sample picture). Some systems may be capable of digitally erasing leftover portions of the placeholder patch. Erasing the leftover portions may prevent the leftover portions from impacting future evaluations based on the final adversarial image (e.g., if an object detection system fails to identify an object, a user may be unsure if this is a success of the adversarial patch or due to the leftover portions). However, erasing the leftover portions is also more likely to introduce additional unwanted digital artifacts which may reduce realism of the overall image (and therefore reduce confidence of any evaluations based on the image) more than simply leaving the leftover portions of the placeholder patch in the image.

If the sample picture does not include a placeholder patch, operation 312 may include utilizing a region identified at operation 306 for purposes of determining a geometric transformation. For example, operation 306 may include identifying, via an object detection model, a person wearing a shirt, and further selecting a region of the shirt as a final destination of a transformed patch (e.g., a shoulder region of a sleeve of the shirt, a chest region of the shirt, etc.). Operation 312 may then insert the transformed patch onto the identified region. Once the transformed patch is inserted into the sample picture, the resulting adversarial image is output and method 300 ends at 314.

Figures 4A, 4B, 4C, 4D:
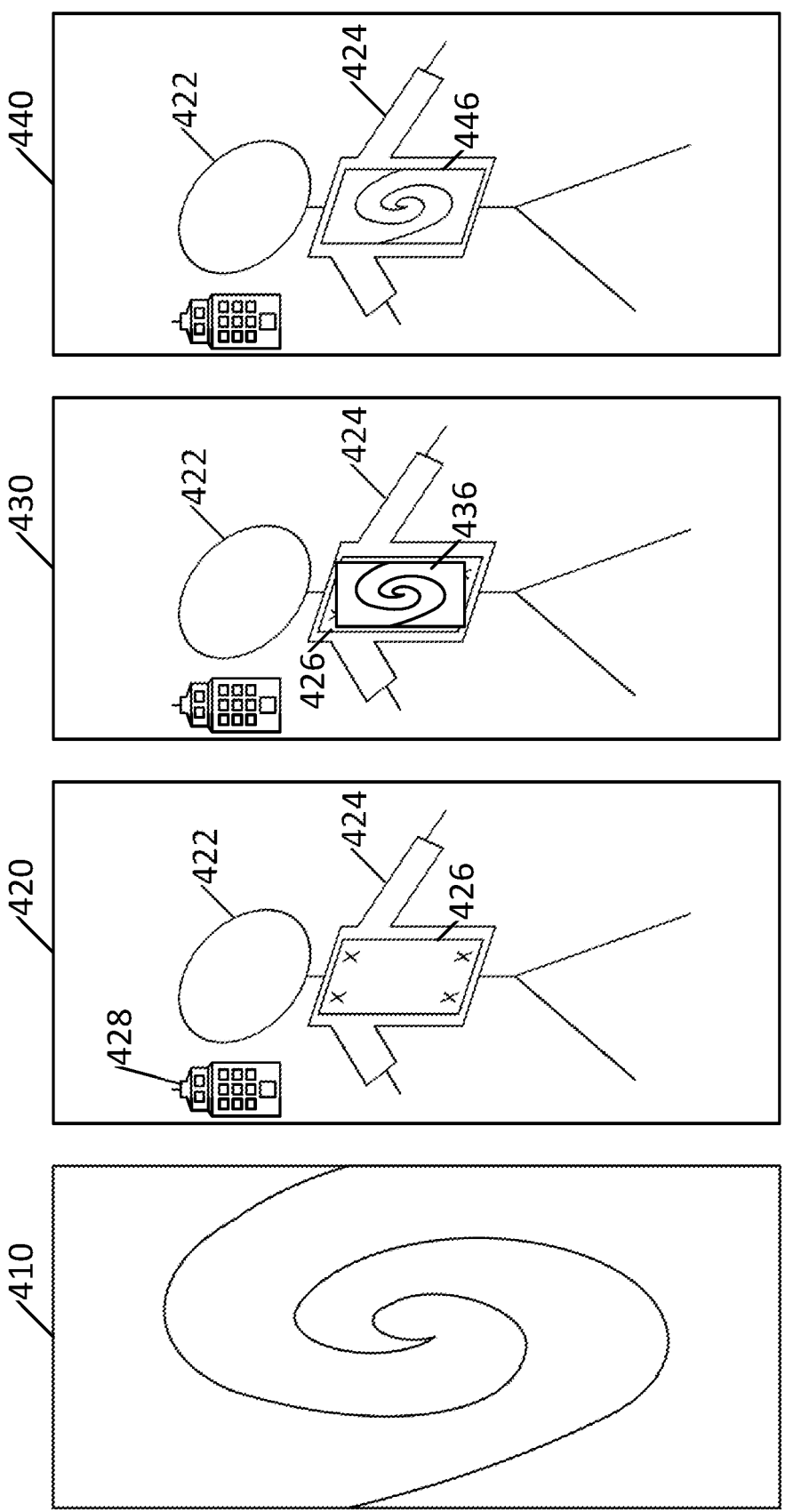
FIG. 4A is an example adversarial patch, consistent with several embodiments of the present disclosure.
FIG. 4B is an example picture depicting a user wearing a shirt with a placeholder patch on it, consistent with several embodiments of the present disclosure.
FIG. 4C is a first example image after an adversarial image generator has inserted an adversarial patch into a picture, consistent with several embodiments of the present disclosure.
FIG. 4D is a second example image after a trained adversarial image generator has inserted an adversarial patch into a picture, consistent with several embodiments of the present disclosure.

FIG. 4A is an example adversarial patch 410. Patch 410 may have been received from an external database, generated by a patch generator, etc. Patch 410 is merely an abstract example of an adversarial patch; the specific design of patch 410 as depicted in FIG. 4 may not be particularly effective.

FIG. 4B is an example picture 420 depicting a user 422 wearing a shirt 424 with a placeholder patch 426 on it, consistent with several embodiments of the present disclosure. Picture 420 may be captured by a camera. In some instances, a developer of a system consistent with the present disclosure may apply placeholder patch 426 to shirt 424 and capture picture 420. Further, in some instances, placeholder patch 426 may be designed to enable image tracking. For example, placeholder patch 426 may include scan targets to further enable quick identification/location of patch 426 in picture 420. This may be advantageous as it can enable a developer to quickly acquire sample pictures in multiple environments. Building 428 appears in a background of picture 420; other sample pictures may be captured in different environments, lighting conditions, with different backdrops, etc. Notably, user 422 is standing at an angle relative to the perspective of picture 420; thus, while placeholder patch 426 may have been rectangular, it appears roughly as a parallelogram in picture 420. This is one aspect where the scan targets of placeholder patch 426 are helpful. However, sample picture 420 is provided for exemplary purposes only; sample pictures do not need to depict a person wearing a shirt, nor do they require a placeholder patch.

FIG. 4C is a first example image 430 after an adversarial image generator has inserted an adversarial patch 436 into a picture (such as picture 420), consistent with several embodiments of the present disclosure. Adversarial patch 436 may be based on adversarial patch 410. Notably, adversarial patch 436 is simply resized and digitally inserted over shirt 424 (parts of placeholder patch 426 can even still be seen "underneath" patch 436). This may be because, for example, the adversarial image generator used to generate image 430 is untrained (or poorly trained), and as a result is only capable of placing the adversarial patch over placeholder patch 426. At first, this may appear to be useful, as this is likely to mean that adversarial patch 436 will perform similarly to adversarial patch 410 (because patch appearance is a controlling factor of patch performance). However, image 430 may not be a realistic example. In other words, a picture captured of user 422 wearing shirt 424 with patch 410 included on shirt 424 is likely to result in the patch appearing at least slightly different from the "raw" patch 410 (due to conditions such as a stance/angle that user 422 is standing at). Therefore, image 430 is unlikely to be helpful for purposes of evaluating performance of patch 410 and/or an object detection model trained to defeat adversarial patches, as user 422 (and, more particularly, shirt 424) is standing at an angle relative to a camera capturing picture 420. Thus, a rectangular adversarial patch like patch 410, if depicted on shirt 424, may be expected to appear at an angle similar to placeholder patch 426. Of course, in other instances, it is possible for user 422 (and thus shirt 424) to be facing the camera such that patch 436 may be a reasonably accurate representation.

FIG. 4D is a second example image 440 after a trained adversarial image generator has inserted an adversarial patch 446 into a picture such as picture 420, consistent with several embodiments of the present disclosure. Notably, adversarial patch 446 is rotated and adjusted such that it matches the orientation of placeholder patch 426 of picture 420. Thus, adversarial patch 446 may appear slightly warped/distorted compared to adversarial patch 436 (and, therefore, adversarial patch 410). However, this distortion means that image 440 may be a realistic example of what a picture captured of user 422 wearing shirt 424 with patch 410 imprinted upon shirt 424 would look like. In other words, patch 446 may perform differently from patch 410, but that is actually an advantage, as it enables evaluating and training object detection models based on more realistic examples. More realistic examples may result in better training. As an example, an object detection model trained on images like image 430 may be successful at recognizing user 422 in image 430, but may fail to recognize user 422 in image 440. Put differently, an object detection model trained to defeat adversarial patch 410 may succeed in overcoming the "raw" patch itself, but may fail to identify objects in images containing the patch if the patch is even slightly distorted (such as in image 440).

As an example, adversarial patch 410 may perform exceptionally well when the "raw" patch is evaluated (e.g., when image 430 is input into an object detection model, the model may consistently fail to identify that user 422 is a person). However, when patch 410 is actually printed onto clothing worn by users, patch 410 may fail to deceive models with any consistency. Inputting image 440 into the object detection model may reveal this fact, as the model may be able to identify that user 422 is a person in spite of the presence of patch 446. While a user may be able to print patch 410 onto a shirt and capture a picture similar to image 440, this can be time- and resource-intensive, particularly when scaled. For example, to evaluate three different patches, the user may need to print a first patch onto a first shirt and capture a first picture while wearing the first shirt, print a second patch onto a second shirt and capture a second picture while wearing the second shirt, and print a third patch onto a third shirt and capture a third picture while wearing the third shirt, and then input each picture into an object detection model. In contrast, using systems and methods consistent with the present disclosure, multiple different patches (not shown in FIG. 4A-4D) can be inserted into picture 420 to quickly and efficiently evaluate each patch without having to print a new patch onto a shirt and/or capture a new picture for every patch. A trained adversarial image generator consistent with the present disclosure, being capable of inserting patch 410 into picture 420 to yield image 440, can therefore provide a significant boost to several aspects of adversarial patch analysis, including both patch generation (patch generators can be evaluated/trained based on performance of patches they generate) and patch resistance (object detection models can be evaluated/trained based on performance when face with different patches).

Figure 5:
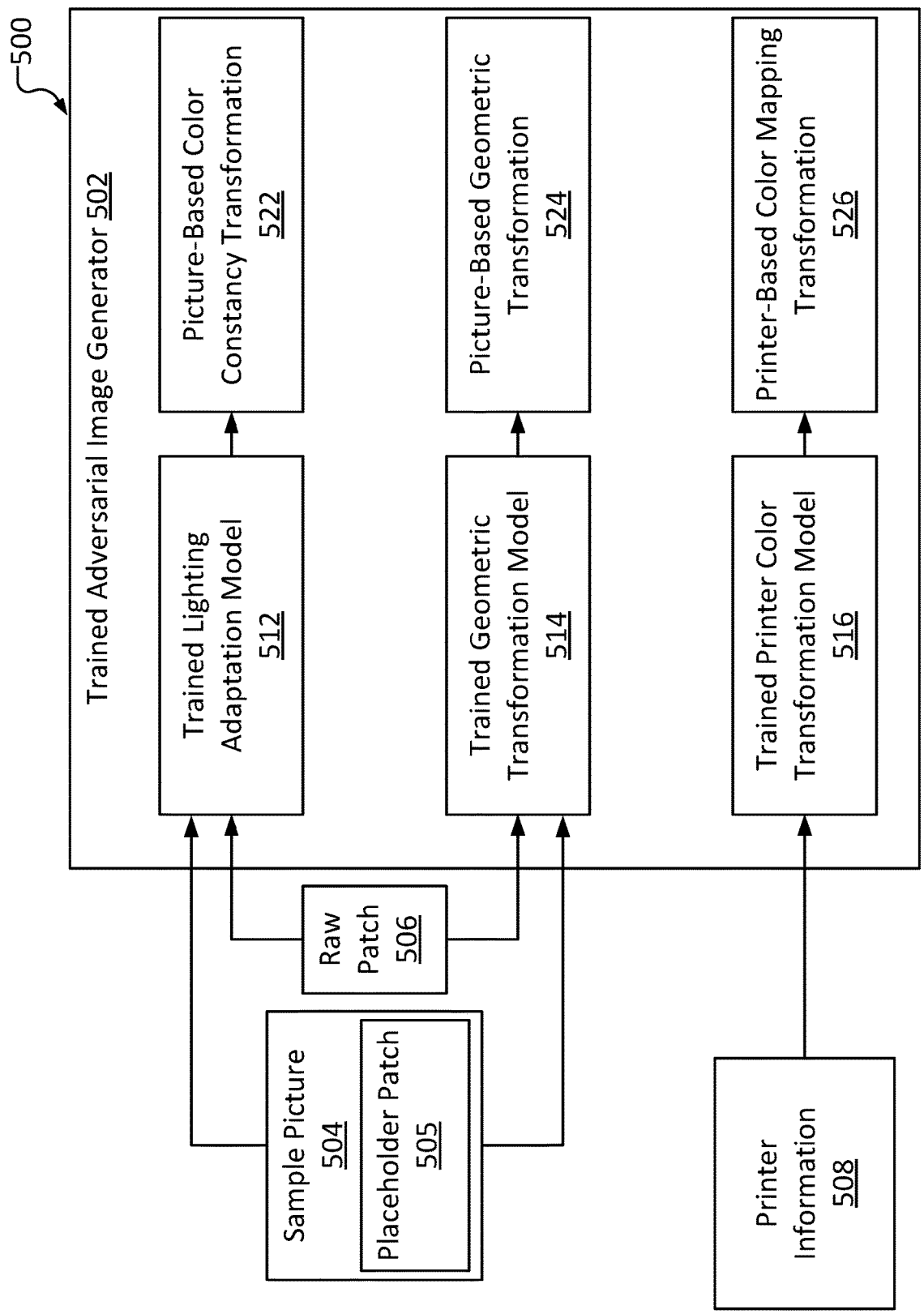
FIG. 5 is a flow diagram depicting an example trained patch image generator, consistent with several embodiments of the present disclosure.

FIG. 5 is a flow diagram 500 depicting an example trained adversarial image generator 502, consistent with several embodiments of the present disclosure. In particular, diagram 500 depicts various component models of adversarial image generator 502 as well as inputs to the component models and their output transformations. As an overview, once adversarial image generator 502 is trained, it functions in two stages: first, a sample picture 504 (including a placeholder patch 505) and a "raw" copy 506 of the placeholder patch can be input into models 512 and 514, while printer information 508 may be input to model 516. This first stage results in transformations 522-526. Then, at a second stage, a different patch (not shown in FIG. 5) can be input into trained adversarial image generator 502, at which point the different patch will be transformed via transformations 522-526 and inserted into sample picture 504. This second stage is described in further detail below with reference to FIG. 6. In particular, while sample picture 504 may have been captured to so as to depict placeholder patch 505, adversarial image generator 502 may also receive a "raw" copy 506 of placeholder patch 505. With inputs 504-508, adversarial image generator 502 can be further configured to generate, through the three models 512, 514, and 516, transformations 522, 524, and 526 to account for lighting, geometry, and printer color discrepancies, respectively.

As an example, a user may wish to determine whether an object detection model can identify a person if the person is wearing a shirt with a given adversarial patch printed onto the shirt. Further, the user may opt to indicate that the adversarial patch was printed onto the shirt via a specific printer model. This printer model may have known discrepancies between a color input to the printer and an apparent color visible in a picture of a printed object. For example, the given printer could be sent a solid square of green (e.g., having a Red/Green/Blue ("RGB") value of (0, 255, 0), print a corresponding square onto a shirt, and then a picture could be captured of the printed shirt (in ideal lighting conditions). In the captured picture, the square may appear slightly tinted (e.g., RGB of (17, 252, 8)). Notably, this type of discrepancy may be relatively consistent for all printers of the same model, and other models of printer may have different discrepancies. A database of this information may be included in adversarial image generator 502 (not shown in FIG. 5), so that upon receipt of printer information 508 listing the model, adversarial image generator 502 can look up the corresponding mapping. In some instances, trained printer color transformation model 516 may simply perform such a lookup and output a printer-based color mapping transformation 526.

Geometric transformation model 514 may be configured to receive sample picture 504 (including placeholder patch 505) and "raw" copy of placeholder patch 506. Geometric transformation model 514 may then identify placeholder patch 505 based on a comparison with raw patch 506, and determine a picture-based geometric transformation 524 based on a discrepancy between raw patch 506 and placeholder patch 505. For example, geometric transformation model 514 may include one or more object detection models trained to identify a shape of raw patch 506 and its counterpart (i.e., placeholder patch 505) in picture 504. In particular, model 514 may identify boundaries/border lines of patch 505 and generate transformation 524. Thus, when transformation 524 is applied to patch 506, the resulting transformed patch will have the same shape as patch 505 within picture 504.

Transformation 524 may include, for example, an array of weights describing how each pixel within a given patch should be translated (moved) in order to recreate the distortion observed in picture 504. For example, if raw patch 506 is a square and placeholder patch 505 in picture 504 is a non-square rectangle (e.g., raw patch 506 may have been shortened along a y-axis), transformation 524 may include an array of weights that accordingly indicate shifts along the y-axis (but not along the x-axis). In some instances, geometric transformation model 514 can also analyze color (for example to identify whether a square patch has rotated) 90°) to transform a later input patch having a shape of raw patch 506 into an output patch having the shape of patch 505.

Lighting adaptation model 512 may be configured to receive sample picture 504 (including placeholder patch 505) and "raw" copy 506 of the placeholder patch. Lighting adaptation model 512 may then identify placeholder patch 505 based on a comparison with raw patch 506, and determine a color discrepancy between the raw placeholder patch 505 and the patch as it appears within picture 504. In some instances, printer-based color mapping transformation 526 may be determined and applied to raw patch 506 prior to model 212's comparison with the apparent patch in picture 504. This may account for a possible printer color discrepancy's contribution to an overall difference in color. As an example, raw placeholder patch 506 may be a solid green (0, 255, 0) square. In sample picture 504, patch 505 may appear tinted, having an RGB of (17, 252, 8). As these colors are different, lighting adaption model 512 may be configured to determine an impact on the discrepancy caused by lighting effects. However, printer information 506 may cause printer color transformation model 516 to generate printer-based color mapping transformation 526. Applying transformation 526 to raw patch 506 may yield a first-stage transformed patch having an RGB of (17, 252, 8). Thus, patch 505 in sample picture 504 may actually appear exactly the same color as an expected patch produced by the printer indicated in information 508. This may indicate that the lighting of the picture actually had no impact on the color of patch 505. In such an instance, picture-based color constancy transformation 522 may simply be omitted (or may be a "multiplication by 1"). In some instances, raw patch 506 may be or include a color spectrum (e.g., a rainbow, a color wheel, etc.) in order to enable lighting adaptation model 512 to account for different impacts of lighting on different colors, if any.

In some instances, geometric transformation 524 may be applied to raw patch 506 instead of or in addition to applying printer-based color mapping transformation 526 to raw patch 506 before model 512 analyzes the transformed patch. This way, lighting adaptation model 512 can identify portions of the patch that may be subjected to localized lighting effects. For example, a wrinkled shirt may result in a strip of a patch reflecting a light source while the rest of the patch may be in relative shadow. By transforming raw patch 506 based on geometric transformation 524 prior to performing color comparisons, model 512 can determine a picture-based color constancy transformation 522 that can recreate such localized lighting effects. As an illustrative example, a user may be wearing a shirt and standing in a pose such that a light source reflects off of an upper portion of a patch, causing the upper portion of the patch to appear "washed out" in a sample picture. The user may also be standing in a way that causes a leftmost portion of the patch to be obscured from view. Comparing colors of the raw placeholder patch to the placeholder patch as it appears in the sample picture may be difficult if the patches are different shapes and sizes, so adversarial image generator 502 may apply geometric transformation 524 to raw patch 506 in order to produce a patch having a similar shape and size. This may allow model 512 to identify that the upper portion of the patch is particularly bright. Model 512 may map the color variations between the geometrically transformed patch and the patch 505 in sample picture 504, such as via a matrix of pixel values ranging from 0 to 1 (where a 0 indicates total darkness, a 1 indicates completely white, and 0.5 indicates no change). In some instances, this mapping may function as the color constancy transformation 522. However, as the mapping is generated based on a different shape from the raw patch 506, in some instances, geometric transformation 524 may be applied in reverse to the mapping in order to generate a color mapping corresponding to the shape of the raw patch 506.

In some instances, sample picture 504 may also include metadata describing "macro" color effects such as, for example, color grading of sample picture 504. As an example, sample picture 504 may have a slight red tint applied to the entire image. If this information is included with sample picture 504, model 512 may adjust transformation 524 to reflect it. For example, transformation 524 may include a corresponding slight red tint.

Figure 6:
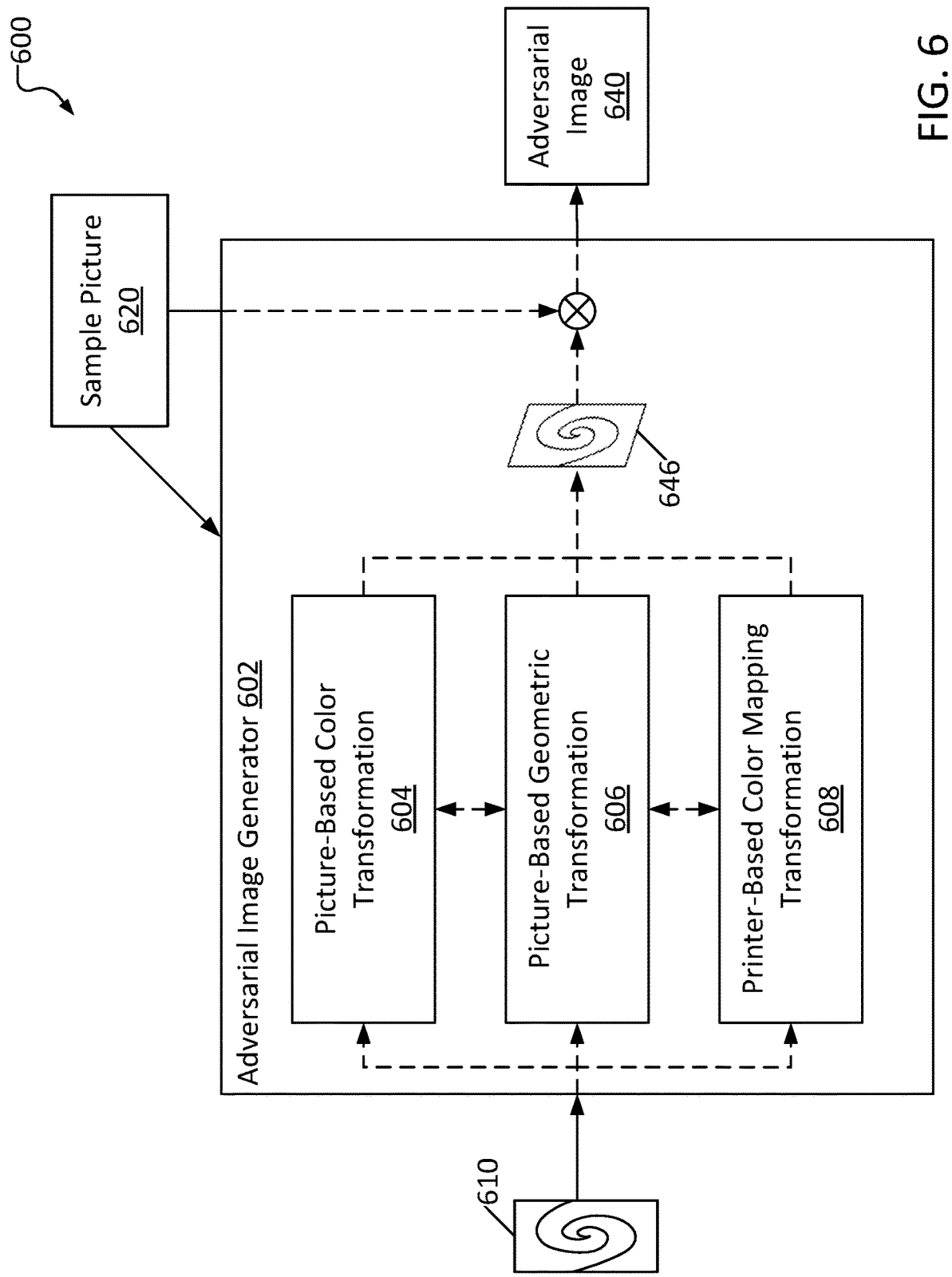
FIG. 6 is a diagram showing an example implementation of a patch image generator, consistent with several embodiments of the present disclosure.

FIG. 6 is a diagram 600 showing an example implementation of a patch image generator 602, consistent with several embodiments of the present disclosure. Image generator 602 may be a trained image generator (e.g., trained according to operation 102 of method 100, method 200, etc.). Diagram 600 is provided as an explanatory example of how an adversarial patch 610 can be modified into a transformed adversarial patch 646, which can then be inserted into a sample picture 620 in order to produce an adversarial image 640. Notably, picture-based color transformation 604, picture-based geometric transformation 606, and printer-based color mapping transformation 608 may have been determined by corresponding trained models (not shown in FIG. 6) based on an input of sample picture 620. In other words, sample picture 620 may be input to generator 602 in order to generate transformations 604-608. Once determined, transformations 604-608 can be performed upon input adversarial patch 610. As described above, these transformations modify a shape and/or color of patch 610 based on the input sample picture 620, yielding a transformed patch 646.

Transformed patch 646 may appear, as a result of transformations 604-608, as if it was originally included in picture 620. Image generator 602 may then integrate transformed patch 646 into sample picture 620, resulting in adversarial image 640. Adversarial image 640 may then be input to an object detection model (not shown in FIG. 6) to evaluate performance of patch 610 and/or the object detection model.

Figure 7:
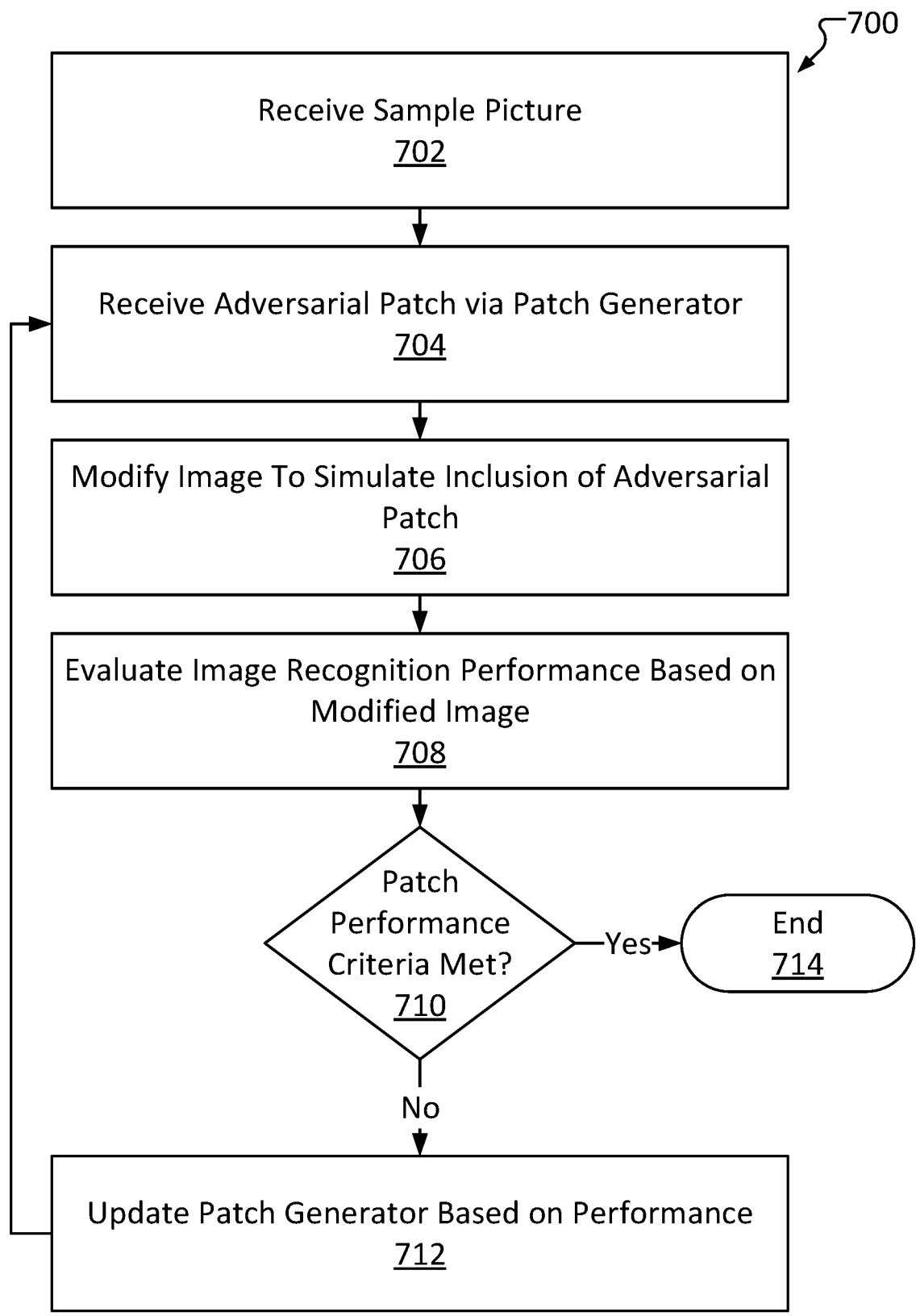
FIG. 7 is a detailed method for training an adversarial patch generator, consistent with several embodiments of the present disclosure.

FIG. 7 is a detailed method 700 for training an adversarial patch generator, consistent with several embodiments of the present disclosure. Method 700 comprises receiving a sample picture at operation 702. As discussed above, a sample picture may depict an object in order to evaluate performance of an object detection model. Operation 702 may include, for example, receiving a picture from a database. In some instances, the sample picture received at operation 702 may include a marking or placeholder patch to designate where an adversarial patch may be inserted. For example, the sample picture may be a picture of a user of a system performing method 100, and the user may be wearing a shirt including scan targets designating boundaries of a patch region. In some instances, the sample picture may include metadata tags designating where a patch should be inserted (for example, a set of four pixels defining a quadrilateral region in the image). While sometimes useful, such indicators may not be required; the sample picture received at operation 702 may, for example, be a stock image or publicly available image without any metadata tags. In some instances, metadata tags may be manually added (for example, a user might designate areas in the image suitable for tags).

Many examples described throughout the present disclosure refer to an image of a person wearing a shirt with an adversarial patch either depicted on the shirt or inserted into the image to appear on the shirt. However, many other examples simulating other use cases for adversarial patches are also considered. For example, adversarial patches may be tested or depicted on road signs, animals, bodies of text such as license plates, etc.

Method 700 further comprises generating an adversarial patch via an adversarial patch generator at operation 704. In general, operation 704 may include selecting a size of the patch and adding features to a "template" to generate a patch. For example, operation 704 may include selecting a 600×600 pixel patch (based on a default value or user input). A trained patch generator might add specific features to a particular template in order to yield an effective adversarial patch; for example, a trained patch generator might add curves and edges according to a particular pattern, resulting in modifying the template image into the adversarial patch. However, in some instances, the adversarial patch generator may initially be untrained. For example, operation 704 may initially include generating a set of random pixels (for example, each pixel may have randomly determined red/green/blue (RGB) values) for use as a template. In other instances, the template may initially simply be a blank (i.e., white) image. Further, an untrained patch generator may modify the template in a random manner. For example, an artificial neural network (ANN) may be utilized, including various layers, connections and weights; an untrained ANN may initially have random or default weights, which may be adjusted over time. In some instances, operation 704 may utilize an adversarial patch that is known to be effective (a "known-good" patch) as a template for generating a new patch.

Operation 704 may include generating a patch based on a given distance. For example, operation 704 may include generating a patch designed to be effective within 5 meters (which may be considered a "near" patch/distance in some instances). In some instances, operation 704 may include generating a patch designed to be effective at 15 meters (considered a "far" patch/distance).

Over time, generation at operation 704 may be refined. For example, certain features (such as concentrations of curves/edges, color gradients, etc.) may be learned to be particularly useful in fooling classifiers. Thus, even if initial iterations of operation 704 may be mostly random, in some instances operation 704 may include modifying a template based upon learned features to generate an effective adversarial patch. These refinements are often range-specific. For example, a first assortment of curves might be useful for deceiving recognition systems at near distances but useless at far distances. Therefore, modifying the patch generator to include the first assortment of curves in output patches might be useful for a near patch generator but unhelpful for a far patch generator. In view of this, the features implemented at operation 704 may be vary depending upon whether the generated patch is intended to be effective at a near distance or a far distance.

Method 700 further comprises modifying, at operation 706, the sample picture acquired via operation 702 to insert the adversarial patch generated via operation 704 in the image. The modifications of operation 706 may result in an adversarial image which may appear as if the adversarial patch were a part of the sample picture, as discussed in detail above. For example, a sample picture may depict a person wearing a shirt with a blank patch on it. Operation 706 may include editing the sample picture to look as if the person's shirt had the adversarial patch on it rather than the blank patch. For example, operation 706 may include identifying a size and shape of the blank patch and modifying the adversarial patch to match. As an example, an adversarial patch may be a square having sides 600 pixels in length. Operation 706 may include detecting a blank patch on a person's shirt, identifying that the blank patch is in the shape of a parallelogram having sides that are 50 pixels in length. Operation 706 may further include converting the adversarial patch from a square shape into the parallelogram shape, and scaling the size by 50/600. The resulting modified adversarial patch may then be overlaid over the blank patch in the image, resulting in the adversarial patch appearing as though the image were captured of a person wearing a shirt bearing the adversarial patch. In some instances, operation 706 may account for lighting, a disconnect between digital colors of the generated patch and printed colors that might be produced by the manufacture of the shirt depicted in the image, etc. when modifying the image.

Method 700 further comprises evaluating object detection model performance at operation 708. Operation 708 may include, for example, submitting the modified image as input to an object detection model and receiving an output. For example, an object detection model such as YOLO v3 may receive images as input, analyze the image in an attempt to recognize and identify objects depicted in the image, and output results of the analysis including identification of objects recognized in the image. In some instances, the output may include a classification and a confidence value describing how confident the model is in its classification. For example, the model may output "98% dog" indicating that the model is 98% confident that the image depicts a dog. Operation 708 may include evaluating an accuracy of the output of the system based on annotations of the modified image. As an example, operation 708 may include determining whether an object detection model is able to correctly identify that a person wearing the patch in the modified image was a person.

For example, a sample picture may depict a person wearing a shirt. The sample picture may be known to depict a person (either via metadata tags or via a user manually identifying that the picture depicts a person). The sample picture may be modified to include the adversarial patch on the person's shirt, and the modified image may be submitted to an object detection model. The object detection model may output any recognized objects (including people). If the system determines that no people are present in an image that is known to include a person, the accuracy of the output may be evaluated as 0%. If the system determines that three people are present in an image that is known to include four people, the accuracy of the output may be 75%. If the system determines that four people are present in an image that is known to include two people, the accuracy of the output may be 50%, etc.

The object detection model utilized at operation 708 may be an existing, pretrained system (e.g., YOLOv3) or can be a newly-trained system. In general, an accurate system is preferable, as an inaccurate system may erroneously result in the generator being designated as effective.

Inclusion of an adversarial patch in an image may negatively impact accuracy of an object detection model. Such an impact can be described as a performance of the patch. Patches can be associated with one or more performance criteria, describing how effective the patch is at disrupting performance of object detection models.

Method 700 further comprises determining whether performance criteria of the patch are met at operation 710. Operation 710 may include, for example, comparing the performance identified at operation 808 to one or more thresholds, such as an accuracy threshold. For example, an accuracy threshold of 15% or lower may be a performance criterion; if the system is unable to defeat the patch at least 85% of the time, the patch's performance criteria may be met.

If the patch's performance criteria are not met (710 "No"), method 700 further comprises updating, at operation 812, the patch generator based on the performance. Operation 712 may include adjusting one or more weights and/or connections in a machine learning model utilized in the patch generator. The adjustments made at operation 712 may be based on impact of previous adjustments; for example, if a first weight is increased and the patch's performance decreases, then operation 712 may include decreasing the first weight. In some instances, adjustments made at operation 712 may be random. In some instances, changes that are evaluated to result in more significant impacts on performance may be focused on. For example, a patch generator may be an artificial neural network (ANN) having a number of interconnected nodes, with each connection having a given weight. Changes to the generator may comprise changes to the weights of the connections. For example, a weight may be increased or decreased, and a resulting impact on generated patch performance can be evaluated.

Once updates are made, method 700 loops back to operation 704, generating a new patch from the updated patch generator. Operations 706-710 may then be repeated. As stated above, impacts of the adjustments made at operation 712 may be evaluated at subsequent iterations. For example, once a weight is increased or decreased, the resulting impact can be evaluated by generating a new patch via the revised generator, inserting the new patch into a sample picture, submitting the new modified image to an object detection model, and comparing an accuracy of the object detection model to that previously evaluated at operation 708. If increasing a first weight results in a performance improvement, further increases to the first weight may be tested.

Once the patch's performance criteria are met (710 "Yes"), method 700 proceeds to end at operation 714. In some instances, performance criteria may require several successful iterations before the generator is considered fully trained. As an example, a single patch in a single modified adversarial image may successfully deceive an object detection model. However, in order to ensure that this is not a coincidence/fluke, the same patch may be tested using other sample pictures.

In some instances, trained patch generators may include some degree of randomization when generating patches; in other words, the same generator may be able to generate multiple different adversarial patches designed to perform the same task (e.g., hinder performance of an object detection model). Training a patch generator to generate unique adversarial patches that are all consistently able to deceive object detection models may yield a more expansive training set, useful for training an object detection model to defeat adversarial patches. Thus. In some instances, in order to ensure that a single successful iteration is not a fluke, the patch generator may generate additional patches, to be used in additional images, to verify that the patch generator is consistently able to generate patches that can deceive recognition systems.

As different object detection models may perform differently, in some instances, method 700 may be performed using several different models to attempt to train a patch generator to generate adversarial patches capable of deceiving all available models. However, this may substantially increase training time and resource requirements, and there is no guarantee that a single patch generator may be able to generate patches that consistently deceive all object detection models. Thus, in some instances, method 700 may be repeated with different models, resulting in multiple patch generators. For example, method 700 may be performed with a first object detection model, resulting in a first adversarial patch generator capable of consistently generating adversarial patches that can fool the first object detection model. Method 700 may then be repeated for a second object detection model, resulting in a second adversarial patch generator (different from the first generator) capable of consistently generating adversarial patches that can fool the second object detection model.

The generator trained via method 700 may be configured to generate patches effective in particular environmental conditions. For example, the generator may be trained to generate patches effective in bright lighting conditions, effective from far distances, effective even when only partially visible, etc. The conditions the generator is "tailored" toward in this way can be controlled at operations 702 and 706 (i.e., the operations involving the picture). For example, in order to train a far-distance patch generator, operation 702 may include selecting a sample picture depicting a person far from a camera capturing the image. Then, after inserting the adversarial patch into the picture at operation 706, the resulting modified image may simulate the adversarial patch relatively far from the camera. Similarly, in order to train a bright-light patch generator (i.e., a generator that generates adversarial patches which are effective in bright-light conditions), operation 702 may include selecting a sample picture depicting a person standing in particularly bright light. Then, after inserting the adversarial patch into the picture at operation 706, the resulting modified image may simulate the adversarial patch in relatively bright lighting conditions.

Further, in some instances, multiple different generators can be trained for each object detection model. For example, method 700 can be performed a first time to train a first near generator using a first object detection model. Method 700 can be performed a second time to train a first far generator (distinct from the first near generator) using the same first object detection model, and so on.

Figure 8D:
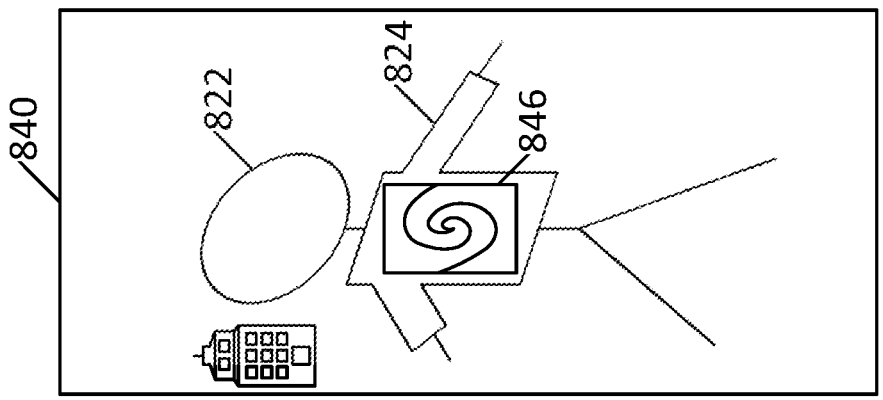
FIG. 8D depicts a sample picture including a user wearing a shirt bearing a pre-transformed patch, consistent with several embodiments of the present disclosure.
Figure 8C:
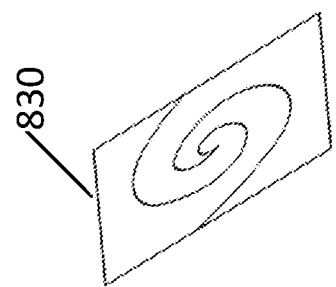
FIG. 8C depicts an example pre-transformed adversarial patch, consistent with several embodiments of the present disclosure.
Figure 8B:
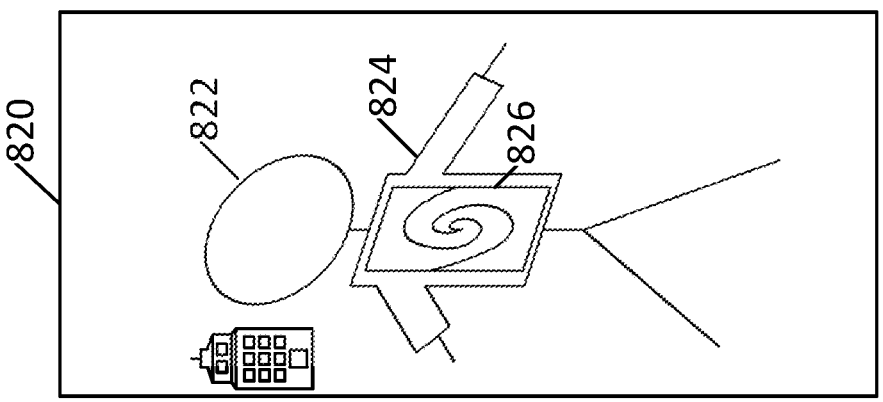
FIG. 8B depicts a sample picture captured of the patch after being printed onto a shirt worn by a user, consistent with several embodiments of the present disclosure.
Figure 8A:
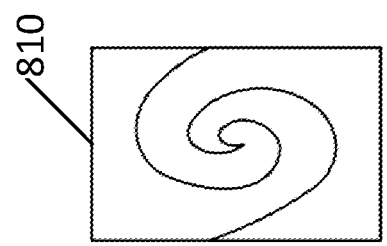
FIG. 8A depicts an adversarial patch, consistent with several embodiments of the present disclosure.

In some instances, a patch generator can essentially be trained to generate patches and then effectively "pre-distort" the patches. FIG. 8A-8D depict examples of how such an example may be implemented. FIG. 8A depicts an adversarial patch 810, consistent with several embodiments of the present disclosure. FIG. 8B depicts a sample picture 820 captured of patch 810 after being printed onto a shirt 824 worn by a user 822, consistent with several embodiments of the present disclosure. As user 822 is standing at an angle, patch 810 may appear distorted (depicted in FIG. 8B as distorted patch 826). Patch 810 may be particularly effective at deceiving object detection models, but only when it appears as shown in FIG. 8A, or as close to it as possible. In other words, performance of patch 810 may drop dramatically with relatively minor distortions, so distorted patch 826 may fail to deceive an object detection model.

To address this, in some instances, the patch may be preemptively transformed in reverse. FIG. 8C depicts an example pre-transformed adversarial patch 830, consistent with several embodiments of the present disclosure. FIG. 8D depicts a sample picture 840 including user 822 wearing a shirt 824 bearing pre-transformed patch 830, consistent with several embodiments of the present disclosure. Notably, due to the angle at which user 822 is standing, patch 830 is distorted (depicted in FIG. 8D as distorted patch 846). However, this distortion may result in patch 846 appearing nearly identical to patch 810, resulting in relatively high performance. While the examples depicted in FIGS. 8A-8D may be most useful only in relatively narrow circumstances, these are merely provided as illustrative examples of the overall concept that a generator may be trained to generate adversarial patches that are pre-transformed such that, upon being distorted, they appear in pictures in their most effective form. In particular, this may be useful when accounting for color transformations resulting from printer color discrepancies; if colors of a patch are an important factor of the performance of the patch (and colors often are), then preemptively adjusting the patch such that, when printed, it actually has the colors of the "raw" patch may be particularly advantageous. Training generators to be effective in this manner can correspondingly improve training of object detection systems, as described above with reference to method 900.

Figure 9:
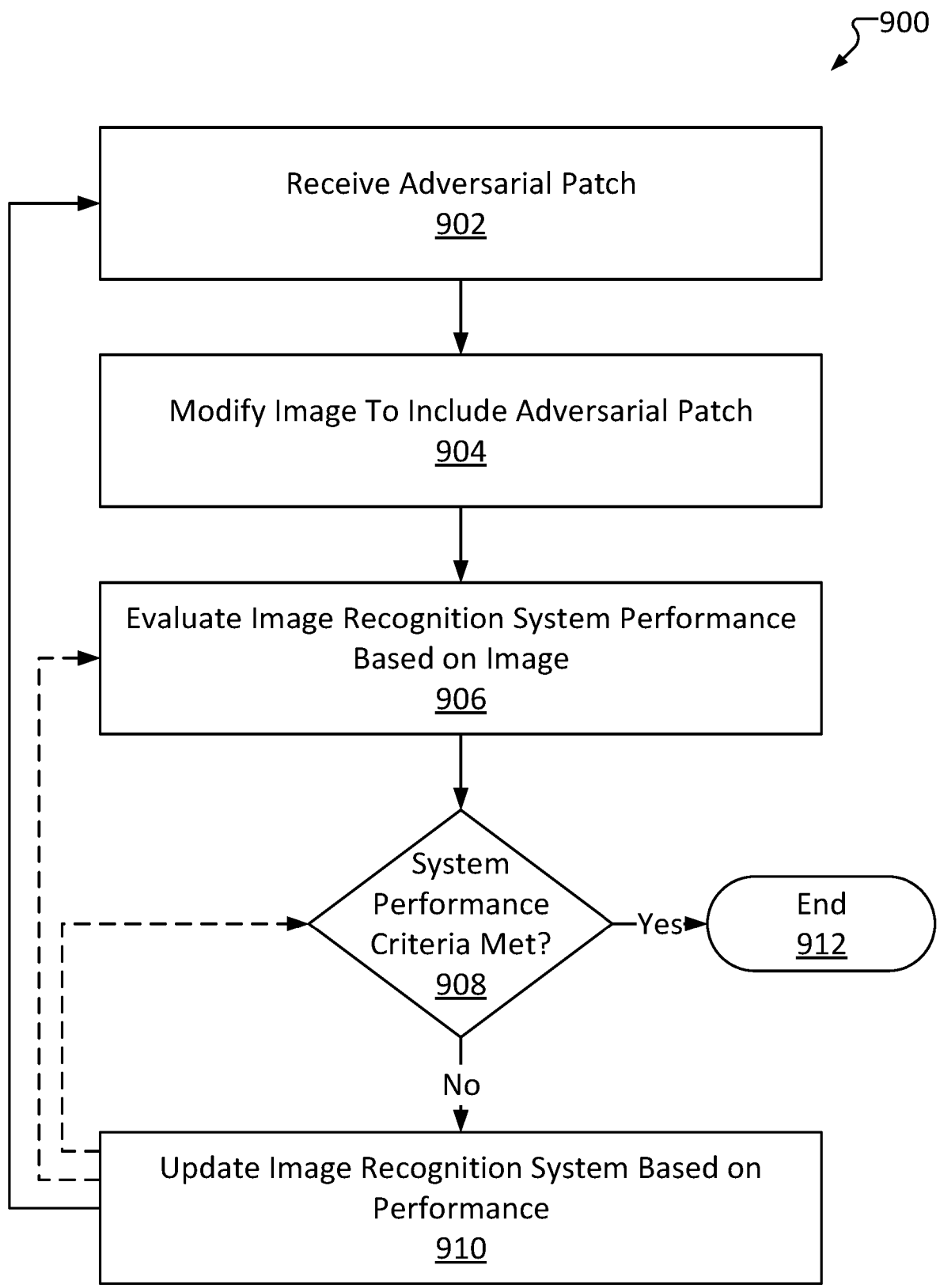
FIG. 9 is a detailed method for training an object detection model to defeat adversarial patches, consistent with several embodiments of the present disclosure

FIG. 9 is a detailed method 900 for training an object detection model to defeat adversarial patches, consistent with several embodiments of the present disclosure. Method 900 comprises receiving an adversarial patch at operation 902. Operation 902 may include, for example, receiving an adversarial patch from a local or online database, from a user, or the patch may be generated via an adversarial patch generator.

Method 900 further comprises modifying, at operation 904, a picture to include the adversarial patch. Operation 904 may be performed by, for example, a trained adversarial image generator, such as one trained via operation 102/method 200. For example, operation 904 may include utilizing a series of transformations produced by trained models such as a geometric transformation to transform a shape of the adversarial patch, a lighting adjustment transformation to account for lighting conditions of the picture (e.g., to adjust a brightness of the patch to match its surroundings), and a printer color transformation to adjust a color of the patch in order to simulate a color discrepancy introduced by a printing process. The patch may be transformed via each of these models (order may vary) and then be inserted into the sample picture, resulting in a first adversarial image.

Method 900 further comprises evaluating an object detection model's performance based on the first adversarial image at operation 906. Operation 906 may include, for example, submitting the first adversarial image to an object detection model and causing the system to attempt to classify/detect objects in the image. Results of the system can then be compared to known values. For example, operation 906 may include determining whether an object in the first adversarial image bearing the (transformed) adversarial patch was correctly detected and/or identified. Further, a confidence value of the object detection model may be retrieved.

Method 900 further comprises determining whether object detection model performance criteria have been met at operation 908. In some instances, operation 908 may include evaluating multiple criteria, such as evaluating a maximum overall performance, enforcing a minimum performance, etc., particularly when operation 906 includes multiple objects to detect. For example, an object detection model may be evaluated to identify a first object in an adversarial image including a transformed adversarial patch with 85% confidence and a second object in the adversarial image with 93% confidence. An overall performance may be a simple arithmetic mean of the two (i.e., (85%+93%)/2=89%). In some instances, performance criteria of the model may include a minimum overall performance of 95%, meaning the overall performance must meet or exceed 95% in order for the criterion to be met (in which case, the example object detection model would have failed, as 89%<95%). In some instances, performance criteria of the model may include a minimum absolute performance of 90%, all particular performances must meet or exceed 90% in order for the criterion to be met (in which case, the example object detection model would also have failed, as even though 93%>90%, 85%<90%). Of course, the specific thresholds can vary and be controlled by users. These thresholds can be changed based upon use case; for example, a higher minimum overall performance of 99% may result in a more adversarial-patch-resilient object detection model, but may require additional resources to train. In some instances, performance criteria can require multiple consecutive successes in order to confirm that a given success if not a coincidence or fluke.

If system performance criteria have not been met (908 "No"), method 900 further comprises updating, at operation 910, the object detection model based on the performances. Operation 910 may include, for example, adjusting one or more weights of a machine learning model, etc.

Once performance criteria have been met (908 "Yes"), method 900 ends at 912. Thus, method 900 can train an object detection model to reliably defeat adversarial patches based on realistic examples with minimal investment in producing physical embodiments of the patches. In other words, the model can be trained without printing multiple patches onto multiple shirts and attempting to capture sets of pictures of each patch, etc. Thus, model 900 is advantageously scalable; adding additional patches/sample pictures to a training pool may only cost additional training time.

Figure 10:
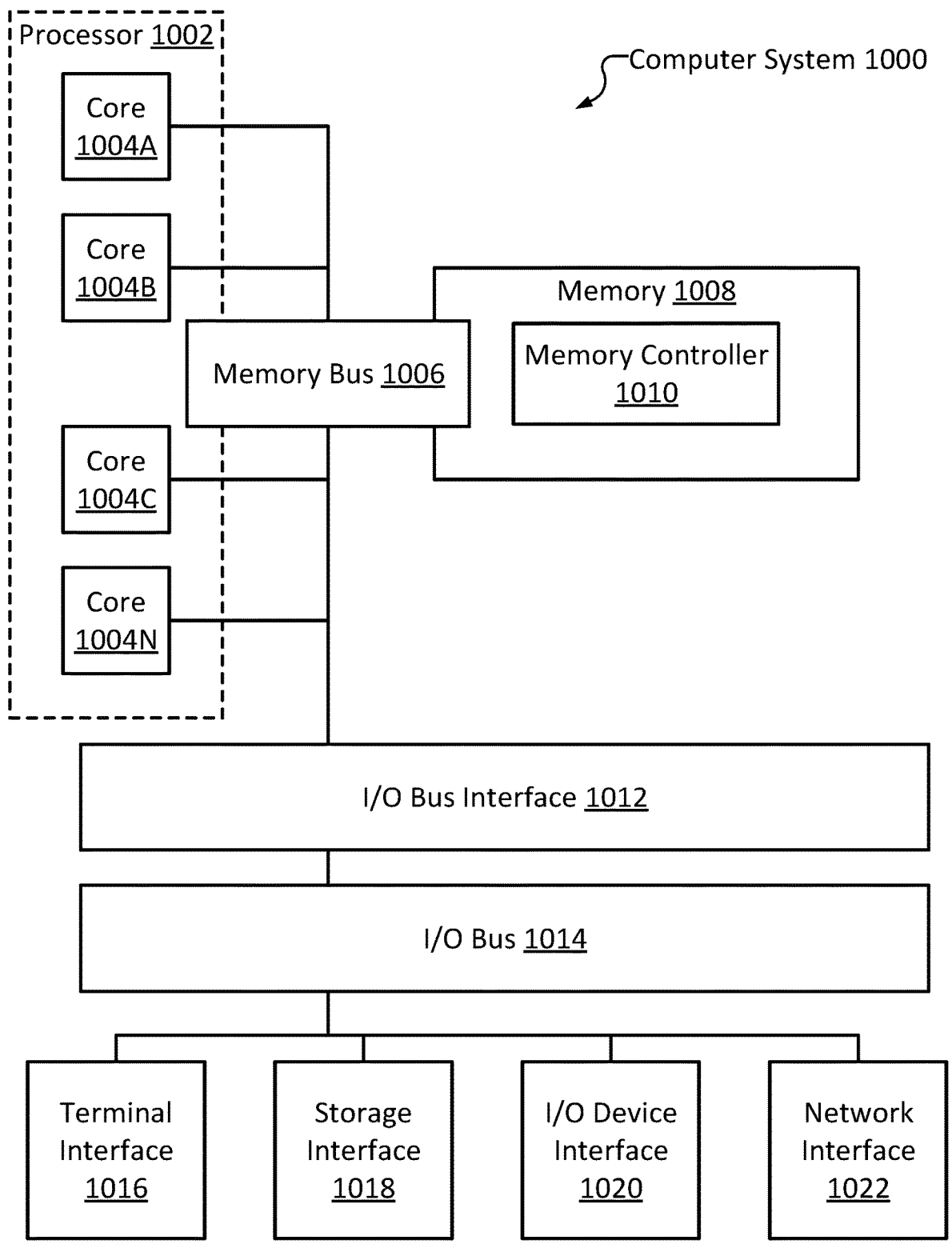
FIG. 10 illustrates a high-level block diagram of an example computer system that may be used in implementing embodiments of the present disclosure.

Referring now to FIG. 10, shown is a high-level block diagram of an example computer system 1000 that may be configured to perform various aspects of the present disclosure, including, for example, methods 100, 200, 300, 800, and 900. The example computer system 800 may be used in implementing one or more of the methods or modules, and any related functions or operations, described herein (e.g., using one or more processor circuits or computer processors of the computer), in accordance with embodiments of the present disclosure. In some embodiments, the major components of the computer system 1000 may comprise one or more CPUs 1002, a memory subsystem 1008, a terminal interface 1016, a storage interface 1018, an I/O (Input/Output) device interface 1020, and a network interface 1022, all of which may be communicatively coupled, directly or indirectly, for inter-component communication via a memory bus 1006, an I/O bus 1014, and an I/O bus interface unit 1012.

The computer system 1000 may contain one or more general-purpose programmable processors 1002 (such as central processing units (CPUs)), some or all of which may include one or more cores 1004A, 1004B, 1004C, and 1004N, herein generically referred to as the CPU 1002. In some embodiments, the computer system 1000 may contain multiple processors typical of a relatively large system; however, in other embodiments the computer system 1000 may alternatively be a single CPU system. Each CPU 1002 may execute instructions stored in the memory subsystem 1008 on a CPU core 1004 and may comprise one or more levels of on-board cache.

In some embodiments, the memory subsystem 1008 may comprise a random-access semiconductor memory, storage device, or storage medium (either volatile or non-volatile) for storing data and programs. In some embodiments, the memory subsystem 1008 may represent the entire virtual memory of the computer system 1000 and may also include the virtual memory of other computer systems coupled to the computer system 1000 or connected via a network. The memory subsystem 1008 may be conceptually a single monolithic entity, but, in some embodiments, the memory subsystem 1008 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 1008 may contain elements for control and flow of memory used by the CPU 1002. This may include a memory controller 1010.

Although the memory bus 1006 is shown in FIG. 10 as a single bus structure providing a direct communication path among the CPU 1002, the memory subsystem 1008, and the I/O bus interface 1012, the memory bus 1006 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1012 and the I/O bus 1014 are shown as single respective units, the computer system 1000 may, in some embodiments, contain multiple I/O bus interface units 1012, multiple I/O buses 1014, or both. Further, while multiple I/O interface units are shown, which separate the I/O bus 1014 from various communications paths running to the various I/O devices, in other embodiments some or all of the I/O devices may be connected directly to one or more system I/O buses.

In some embodiments, the computer system 1000 may be a multi-user mainframe computer system, a single-user system, or a server computer or similar device that has little or no direct user interface but receives requests from other computer systems (clients). Further, in some embodiments, the computer system 1000 may be implemented as a desktop computer, portable computer, laptop or notebook computer, tablet computer, pocket computer, telephone, smart phone, mobile device, or any other appropriate type of electronic device.

It is noted that FIG. 10 is intended to depict the representative major components of an exemplary computer system 1000. In some embodiments, however, individual components may have greater or lesser complexity than as represented in FIG. 10, components other than or in addition to those shown in FIG. 10 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   training an adversarial image generator;
   receiving a sample picture, the sample picture depicting an object;
   receiving an adversarial patch; and
   generating, via the adversarial image generator, an adversarial image, wherein:
   the adversarial image depicts the adversarial patch in the sample picture; and
   the generating includes:
   transforming the adversarial patch using environmental attributes of the sample picture, resulting in a transformed adversarial patch that is more similar than the adversarial patch to the sample picture; and
   inserting the transformed adversarial patch into the picture, resulting in the adversarial image, wherein the training the adversarial image generator includes:
   receiving a raw training patch;
   receiving a first training picture, the first training picture including an embedded training patch; and
   mapping a first transformation between the raw training patch and the embedded training patch.

2. The method of claim 1, wherein the training the adversarial image generator further includes:
   identifying a first set of environmental attributes, the first set of environmental attributes associated with the depicted training patch of the first training picture;
   receiving a second training picture, the second training picture depicting the training patch;
   mapping a second transformation between the received training patch and the depicted training patch of the second training picture;

identifying a second set of environmental attributes, the second set of environmental attributes associated with the depicted training patch of the second training picture; and updating a model to output the first transformation based on receipt of the first set of environmental attributes and to output the second transformation based on receipt of the second set of environmental attributes.

3. The method of claim 2, further comprising:

receiving a third set of environmental attributes, the third set of environmental attributes associated with the sample patch depicted in the sample picture;

inputting the third set of environmental attributes into the model; and receiving an output transformation from the model based on the inputting, wherein the transforming the adversarial patch is based on the output transformation.

4. The method of claim 2, wherein the first set of environmental attributes describes lighting conditions of the first training picture.

5. The method of claim 2, wherein the first set of environmental attributes describes a printer color discrepancy.

6. The method of claim 1, further comprising training an adversarial patch generator, the training the adversarial patch generator including updating a weight by an amount, wherein the receiving the adversarial patch includes generating the adversarial patch via the adversarial patch generator.

7. The method of claim 1, further comprising training an object detection model to detect the object, the training the object detection model including:

submitting the adversarial image to the object detection model;

receiving an output from the object detection model as a result of the submitting the adversarial image;

evaluating a performance of the object detection model based on the output; and updating the object detection model based on the performance.

8. A system, comprising:

a memory; and a processor coupled to the memory, the processor configured to:

train an adversarial image generator;

receive a sample picture, the sample picture depicting an object;

receive an adversarial patch; and generate, via the adversarial image generator, an adversarial image, wherein:

the adversarial image depicts the adversarial patch in the sample picture; and the generating includes:

transforming the adversarial patch using environmental attributes of the sample picture, resulting in a transformed adversarial patch that is more similar than the adversarial patch to the sample picture; and inserting the transformed adversarial patch into the picture, resulting in the adversarial image, wherein the training the adversarial image generator includes:

receiving a raw training patch;

receiving a first training picture, the first training picture including an embedded training patch; and mapping a first transformation between the raw training patch and the embedded training patch.

9. The system of claim 8, wherein the training the adversarial image generator further includes:

identifying a first set of environmental attributes, the first set of environmental attributes associated with the depicted training patch of the first training picture;

receiving a second training picture, the second training picture depicting the training patch;

mapping a second transformation between the received training patch and the depicted training patch of the second training picture;

identifying a second set of environmental attributes, the second set of environmental attributes associated with the depicted training patch of the second training picture; and updating a model to output the first transformation based on receipt of the first set of environmental attributes and to output the second transformation based on receipt of the second set of environmental attributes.

10. The system of claim 9, wherein the processor is further configured to:

receive a third set of environmental attributes, the third set of environmental attributes associated with the sample patch depicted in the sample picture;

input the third set of environmental attributes into the model; and receive an output transformation from the model based on the inputting, wherein the transforming the adversarial patch is based on the output transformation.

11. The system of claim 8, wherein the processor is further configured to train an adversarial patch generator, the training the adversarial patch generator including updating a weight by an amount, wherein the receiving the adversarial patch includes generating the adversarial patch via the adversarial patch generator.

12. The system of claim 8, wherein the processor is further configured to train an object detection model to detect the object, the training the object detection model including:

submitting the adversarial image to the object detection model;

receiving an output from the object detection model as a result of the submitting the adversarial image;

evaluating a performance of the object detection model based on the output; and updating the object detection model based on the performance.

13. A computer program product, the computer program product comprising a computer readable storage medium having program instructions embodied therewith, the program instructions executable by a computer to cause the computer to:

train an adversarial image generator;

receive a sample picture, the sample picture depicting an object;

receive an adversarial patch; and generate, via the adversarial image generator, an adversarial image, wherein:

the adversarial image depicts the adversarial patch in the sample picture; and the generating includes:

transforming the adversarial patch using environmental attributes of the sample picture, resulting in a transformed adversarial patch that is more similar than the adversarial patch to the sample picture; and inserting the transformed adversarial patch into the picture, resulting in the adversarial image, wherein the training the adversarial image generator includes:

receiving a raw training patch;

receiving a first training picture, the first training picture including an embedded training patch; and mapping a first transformation between the raw training patch and the embedded training patch.

14. The computer program product of claim 13, wherein the training the adversarial image generator further includes:

identifying a first set of environmental attributes, the first set of environmental attributes associated with the depicted training patch of the first training picture;

receiving a second training picture, the second training picture depicting the training patch;

mapping a second transformation between the received training patch and the depicted training patch of the second training picture;

identifying a second set of environmental attributes, the second set of environmental attributes associated with the depicted training patch of the second training picture; and updating a model to output the first transformation based on receipt of the first set of environmental attributes and to output the second transformation based on receipt of the second set of environmental attributes.

15. The computer program product of claim 14, wherein the instructions further cause the computer to:

receive a third set of environmental attributes, the third set of environmental attributes associated with the sample patch depicted in the sample picture;

input the third set of environmental attributes into the model; and receive an output transformation from the model based on the inputting, wherein the transforming the adversarial patch is based on the output transformation.

16. The computer program product of claim 13, wherein the instructions further cause the computer to train an adversarial patch generator, the training the adversarial patch generator including updating a weight by an amount, wherein the receiving the adversarial patch includes generating the adversarial patch via the adversarial patch generator.

17. The computer program product of claim 13, wherein the instructions further cause the computer to train an object detection model to detect the object, the training the object detection model including:

submitting the adversarial image to the object detection model;

receiving an output from the object detection model as a result of the submitting the adversarial image;

evaluating a performance of the object detection model based on the output; and updating the object detection model based on the performance.

* * * * *